(12) United States Patent
Tsubata

(10) Patent No.: US 8,441,590 B2
(45) Date of Patent: May 14, 2013

(54) ACTIVE MATRIX SUBSTRATE, LIQUID CRYSTAL PANEL, LIQUID CRYSTAL DISPLAY UNIT, LIQUID CRYSTAL DISPLAY DEVICE, AND TELEVISION RECEIVER

(75) Inventor: Toshihide Tsubata, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 222 days.

(21) Appl. No.: 13/126,571

(22) PCT Filed: Aug. 19, 2009

(86) PCT No.: PCT/JP2009/064488
§ 371 (c)(1),
(2), (4) Date: Apr. 28, 2011

(87) PCT Pub. No.: WO2010/052962
PCT Pub. Date: May 14, 2010

(65) Prior Publication Data
US 2011/0211130 A1 Sep. 1, 2011

(30) Foreign Application Priority Data
Nov. 5, 2008 (JP) ................................. 2008-284804

(51) Int. Cl.
*G02F 1/1343* (2006.01)
(52) U.S. Cl.
USPC ......................................................... 349/39
(58) Field of Classification Search .................. 349/39
See application file for complete search history.

(56) References Cited

U.S. PATENT DOCUMENTS

| 5,777,700 | A | 7/1998 | Kaneko et al. |
| 7,324,170 | B2 * | 1/2008 | Baek ............................... 349/38 |
| 2005/0173703 | A1 | 8/2005 | Lebrun |
| 2006/0119753 | A1 | 6/2006 | Luo et al. |

(Continued)

FOREIGN PATENT DOCUMENTS

| EP | 1 621 924 A2 | 2/2006 |
| JP | 7-28091 | 1/1995 |
| JP | 2006-163389 | 6/2006 |
| JP | 2006-221174 | 8/2006 |

OTHER PUBLICATIONS

International Search Report for PCT/JP2009/064488, mailed Sep. 29, 2009.

*Primary Examiner* — Sung Pak
(74) *Attorney, Agent, or Firm* — Nixon & Vanderhye, P.C.

(57) ABSTRACT

Disclosed is an active matrix including: a second capacitor electrode (37) electrically connected to a first pixel electrode (17a); and a first capacitor electrode (77) electrically connected to a second pixel electrode (17b), which second capacitor electrode (37) is provided in a layer sandwiched between the first capacitor electrode (77) and the second pixel electrode (17b). A coupling capacitor is formed between the first capacitor electrode (77) and the second capacitor electrode (37) by having the second capacitor electrode (37) overlap the first capacitor electrode (77) in such a manner that a gate insulating film is sandwiched between the second capacitor electrode (37) and the first capacitor electrode (77), and another coupling capacitor is formed between the second capacitor electrode (37) and the second pixel electrode (17b) by having the second pixel electrode (17b) overlap the second capacitor electrode (37) in such a manner that an interlayer insulating film is sandwiched between the second capacitor electrode (37) and the second pixel electrode (17b). With the foregoing configuration, it is possible in an active matrix substrate of a capacitively coupled pixel division mode to increase its aperture ratio.

23 Claims, 35 Drawing Sheets

U.S. PATENT DOCUMENTS

| | | |
|---|---|---|
| 2006/0192739 A1 | 8/2006 | Shin et al. |
| 2007/0159587 A1 | 7/2007 | Kim et al. |
| 2008/0239183 A1 | 10/2008 | Luo et al. |
| 2009/0190081 A1* | 7/2009 | Kim et al. .................. 349/139 |
| 2011/0025923 A1* | 2/2011 | Tsubata .................. 348/731 |
| 2011/0279735 A1* | 11/2011 | Tsubata .................. 348/731 |
| 2012/0001838 A1* | 1/2012 | Tsubata .................. 345/87 |
| 2012/0026415 A1* | 2/2012 | Tsubata .................. 348/790 |

* cited by examiner

ACTIVE MATRIX SUBSTRATE, LIQUID CRYSTAL PANEL, LIQUID CRYSTAL DISPLAY UNIT, LIQUID CRYSTAL DISPLAY DEVICE, AND TELEVISION RECEIVER

This application is the U.S. national phase of International Application No. PCT/JP2009/064488, filed 19 Aug. 2009, which designated the U.S. and claims priority to Japan Application No. 2008-284804, filed 5 Nov. 2008, the entire contents of each of which are hereby incorporated by reference.

TECHNICAL FIELD

The present invention relates to an active matrix substrate including a plurality of pixel electrodes in a pixel region, and a liquid crystal display device (pixel division mode) that uses the same.

Background Art

As a measure for improving viewing angle dependence of gamma characteristics in liquid crystal display devices (for example, holding down excess brightness and the like in a screen), a liquid crystal display device has been proposed which controls a plurality of sub-pixels in a pixel to have different brightness, so as to display a halftone by an area coverage modulation of these sub-pixels (pixel division mode; for example, see Patent Literature 1).

An active matrix substrate disclosed in Patent Literature 1 (see FIG. 36) has two pixel electrodes 190a and 190b disposed in a pixel region; a source electrode 178 of a transistor is connected to a data line 171, and a drain electrode 175 is connected to the pixel electrode 190a via a contact hole 185. Moreover, a coupling electrode 176 is connected to the drain electrode 175 of the transistor via an expansion 177. Furthermore, the coupling electrode 176 and the pixel electrode 190b overlap each other, and a coupling capacitor is provided on this overlapped part (capacitively coupled pixel division mode).

A liquid crystal display device using this active matrix substrate allows sub-pixels corresponding to the pixel electrode 190a to be bright sub-pixels and sub-pixels corresponding to the pixel electrode 190b to be dark sub-pixels. It is thus possible to display a halftone by the area coverage modulation of these bright sub-pixels and dark sub-pixels.

Citation List

Patent Literature
Patent Literature 1
Japanese Patent Application Publication, Tokukai, No. 2006-221174 A (Publication Date: Aug. 24, 2006)

SUMMARY OF INVENTION

Technical Problem
However, with the foregoing active matrix substrate, the coupling capacitor is formed on a part in which the pixel electrode 190b and the coupling electrode 176 overlap. Hence, in order to secure a sufficient coupling capacitance, the coupling electrode 176 requires having a large area, which as a result causes a decrease in aperture ratio.

An object of the present invention is to increase an aperture ratio of an active matrix substrate of a capacitively coupled pixel division mode.

Solution to Problem
An active matrix substrate of the present invention includes: a data signal line; a first insulating film; a second insulating film; a transistor; a first pixel electrode connected to the data signal line via the transistor; a second pixel electrode; a first capacitor electrode electrically connected to the second pixel electrode; and a second capacitor electrode electrically connected to the first pixel electrode, wherein: the second capacitor electrode is provided in a layer sandwiched between the first, capacitor electrode and the second pixel electrode, the second capacitor electrode overlaps the first capacitor electrode via the first insulating film to form a capacitor between the first capacitor electrode and the second capacitor electrode, and the second pixel electrode overlaps the second capacitor electrode via the second insulating film to form another capacitor between the second capacitor electrode and the second pixel electrode.

According to the configuration, two coupling capacitors (a capacitor formed between a first capacitor electrode and a second capacitor electrode, and a capacitor formed between the second capacitor electrode and a second pixel electrode) are formed in a thickness direction of a substrate, and these two coupling capacitors are parallelized to allow connection of the first and second pixel electrodes via the parallelized two coupling capacitors. As a result, it is possible to increase an aperture ratio by reducing an area of the second capacitor electrode without changing coupling capacitance, and to increase the coupling capacitance without changing the area of the second capacitor electrode (i.e., without changing the aperture ratio).

In this case, the second pixel electrode and the first capacitor electrode may be connected via a contact hole hollowed through the first insulating film and the second insulating film. Moreover, the configuration may be one in which the transistor has a conductive electrode from which the transistor is connected to the first pixel electrode via a contact hole, and the first pixel electrode is connected to the second capacitor electrode via a contact hole different from the contact hole connecting the conductive electrode of the transistor and the first pixel electrode.

Moreover, an active matrix substrate of the present invention includes: a data signal line; a first insulating film; a second insulating film; a transistor; a first pixel electrode connected to the data signal line via the transistor; a second pixel electrode; a first capacitor electrode electrically connected to the first pixel electrode; and a second capacitor electrode electrically connected to the second pixel electrode, wherein: the second capacitor electrode is provided in a layer sandwiched between the first capacitor electrode and the first pixel electrode, the second capacitor electrode overlaps the first capacitor electrode via the first insulating film to form a capacitor between the first capacitor electrode and the second capacitor electrode, and the first pixel electrode overlaps the second capacitor electrode via the second insulating film to form another capacitor between the second capacitor electrode and the first pixel electrode.

According to the configuration, two coupling capacitors (the capacitor formed between the first capacitor electrode and the second capacitor electrode, and the capacitor formed between the second capacitor electrode and the first pixel electrode) are formed in a thickness direction of the substrate, and these two coupling capacitors are parallelized to allow connection of the first and second pixel electrodes via the parallelized two coupling capacitors. As a result, it is possible to increase an aperture ratio by reducing an area of the second capacitor electrode without changing the coupling capacitance, and to increase the coupling capacitance without changing the area of the second capacitor electrode (i.e., without changing the aperture ratio).

In this case, the first pixel electrode and the first capacitor electrode may be connected via a contact hole hollowed through the first insulating film and the second insulating film.

In the present active matrix substrate, the first capacitor electrode may be provided in a same layer as a scanning signal line. Moreover, the second capacitor electrode may be provided in a same layer as the data signal line.

In the present active matrix substrate, the second insulating film may be configured to have a thickness not thicker than that of the first insulating film. Moreover, the first insulating film may be a gate insulating film. Moreover, the second insulating film may be an interlayer insulating film covering a channel of the transistor.

The present active matrix substrate may be configured in such a manner that the first capacitor electrode has two edges running parallel to each other and the second capacitor electrode also has two edges running parallel to each other, and from a plan view perspective of the active matrix substrate, both the edges of the first capacitor electrode are disposed on inner sides of respective edges of the second capacitor electrode.

The present active matrix substrate may be configured in such a manner that the first capacitor electrode has two edges running parallel to each other and the second capacitor electrode also has two edges running parallel to each other, and from a plan view perspective of the active matrix substrate, both the edges of the second capacitor electrode are disposed on inner sides of respective edges of the first capacitor electrode.

The present active matrix substrate may be configured to further include a storage capacitor wire being disposed so as to be overlapped by the first pixel electrode and the second pixel electrode.

The present active matrix substrate includes: a first insulating film; a second insulating film; a transistor; a first pixel electrode electrically connected to the transistor; a second pixel electrode; a first capacitor electrode electrically connected to the second pixel electrode; and a second capacitor electrode electrically connected to the transistor, wherein: the second capacitor electrode is provided in a layer sandwiched between the first capacitor electrode and the second pixel electrode; the second capacitor electrode overlaps the first capacitor electrode via the first insulating film to form a capacitor between the first capacitor electrode and the second capacitor electrode, and the second pixel electrode overlaps the second capacitor electrode via the second insulating film to form another capacitor between the second capacitor electrode and the second pixel electrode.

The foregoing configuration may further include: a third capacitor electrode connected to the second capacitor electrode in a same layer as the second capacitor electrode; and a storage capacitor wire forming a capacitor with the third capacitor electrode.

The present liquid crystal panel includes the active matrix substrate. Moreover, the present liquid crystal panel may be configured including: the active matrix substrate; and a counter substrate having a linear projection for alignment controlling, being disposed in such a manner that at least a part of the first capacitor electrode is disposed below the linear projection. Moreover, the present liquid crystal panel may be configured including: the active matrix substrate; and a counter substrate including a common electrode (counter electrode) that has a slit for alignment controlling, being disposed in such a manner that at least a part of the first capacitor electrode is disposed below the slit.

The present liquid crystal display unit includes: the liquid crystal panel; and a driver. Moreover, the present liquid crystal display device includes: the liquid crystal display unit; and a light source unit. Moreover, a television receiver includes: the liquid crystal display device; and a tuner section configured to receive television broadcast.

Advantageous Effects of Invention

As described above, according to the present active matrix substrate, two coupling capacitors are formed in a thickness direction of a substrate, and these two coupling capacitors are parallelized to allow connection of the first and second pixel electrodes via the parallelized two coupling capacitors. As a result, it is possible to increase an aperture ratio by reducing an area of the second capacitor electrode without changing the coupling capacitance, and to increase the coupling capacitance without changing the area of the second capacitor electrode (i.e., without changing the aperture ratio).

BRIEF DESCRIPTION OF DRAWINGS

FIG. 1 is a plan view illustrating one example of a configuration of the present liquid crystal panel.

FIG. 2 is an equivalent circuit diagram of the present liquid crystal panel.

FIG. 3 is a cross-sectional view taken on X-Y of the liquid crystal panel illustrated in FIG. 1.

FIG. 4 is a timing chart illustrating a driving method of a liquid crystal display device including the liquid crystal panel illustrated in FIG. 1.

FIG. 5 is a schematic view illustrating a display state per frame in a case where the driving method illustrated in FIG. 4 is used.

FIG. 6 is a plan view illustrating how to correct the liquid crystal panel illustrated in FIG. 1.

FIG. 7 is a cross-sectional view taken on X-Y of the liquid crystal panel illustrated in FIG. 6.

FIG. 8 is a plan view illustrating a modification of the liquid crystal panel illustrated in FIG. 1.

FIG. 9 is a plan view illustrating another configuration of the present liquid crystal panel.

FIG. 10 is a cross-sectional view illustrating the liquid crystal panel of FIG. 9.

FIG. 11 is a plan view illustrating a modification of the liquid crystal panel illustrated in FIG. 9.

FIG. 12 is a cross-sectional view of the liquid crystal panel illustrated in FIG. 11.

FIG. 13 is a plan view of a modification of the liquid crystal panel illustrated in FIG. 11.

FIG. 14 is a cross-sectional view of the liquid crystal panel of FIG. 13.

FIG. 15 is a plan view of a modification of the liquid crystal panel illustrated in FIG. 8.

FIG. 16 is a plan view of another modification of the liquid crystal panel illustrated in FIG. 8.

FIG. 17 is a plan view of yet another modification of the liquid crystal panel illustrated in FIG. 1.

FIG. 18 is a plan view of another modification of the liquid crystal panel illustrated in FIG. 8.

FIG. 19 is a plan view of a modification of the liquid crystal panel illustrated in FIG. 15.

FIG. 20 is a plan view of yet another modification of the liquid crystal panel illustrated in FIG. 8.

FIG. 21 is a plan view of a modification of the liquid crystal panel illustrated in FIG. 20.

FIG. 22 is a plan view of another modification of the liquid crystal panel illustrated in FIG. 9.

FIG. 23 is a plan view illustrating yet another configuration of the present liquid crystal panel.

FIG. 24 is a plan view illustrating a modification of the liquid crystal panel illustrated in FIG. 23.

FIG. 25 is a plan view illustrating another modification of the liquid crystal panel illustrated in FIG. 23.

FIG. 26 is an equivalent circuit diagram illustrating yet another configuration of the present liquid crystal panel.

FIG. 27 is a plan view specifically illustrating an example of the liquid crystal panel illustrated in FIG. 26.

FIG. 28 is a schematic view illustrating a halftone display state of a liquid crystal display device including the liquid crystal panel of FIG. 26.

In FIG. 29, (a) is a schematic view illustrating a configuration of the present liquid crystal display unit, and (b) is a schematic view illustrating a configuration of the present liquid crystal display device.

FIG. 30 is a block diagram illustrating an entire configuration of the present liquid crystal display device.

FIG. 31 is a block diagram illustrating functions of the present liquid crystal display device.

FIG. 32 is a block diagram illustrating functions of the present television receiver.

FIG. 33 is an exploded perspective view illustrating a configuration of the present television receiver.

FIG. 34 is a plan view illustrating yet another configuration of the present liquid crystal panel.

FIG. 35 is a cross-sectional view of the liquid crystal panel of FIG. 34.

FIG. 36 is a plan view illustrating a configuration of a conventional liquid crystal panel.

DESCRIPTION OF EMBODIMENTS

One embodiment according to the present invention is as described below, with reference to FIGS. 1 to 35. For easy explanation, a direction in which a scanning signal line extends is denoted as a row direction. However, it is needless to say that the scanning signal line may extend in a horizontal direction or a vertical direction in a used (viewed) state of a liquid crystal display device including the present liquid crystal panel (or an active matrix substrate used therein). Note that drawings of the liquid crystal panel each are illustrated by appropriately omitting alignment control structures (for example, a slit provided in a pixel electrode of an active matrix substrate and a rib formed on a color filter substrate).

Figure 2:
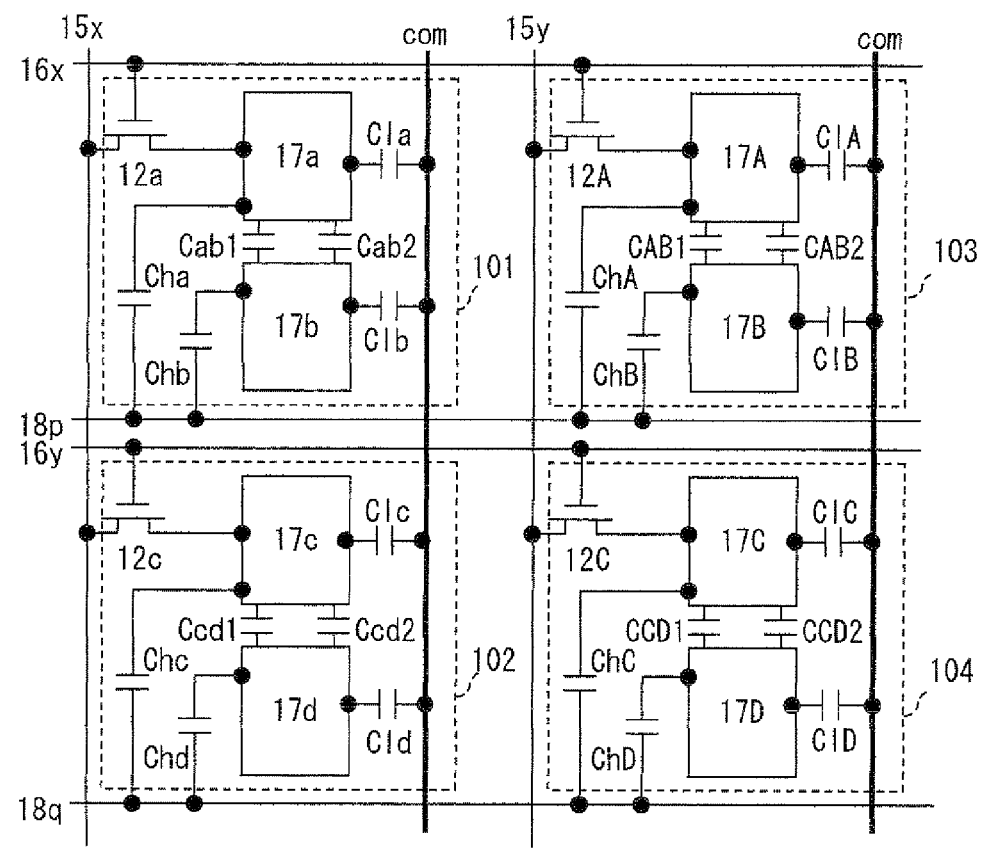
FIG. 2

FIG. 2 is an equivalent circuit diagram of one part of a liquid crystal panel according to the present embodiment (e.g., of a normally black mode). As illustrated in FIG. 2, the present liquid crystal panel includes: data signal lines 15$x$ and 15$y$ that extend in a column direction (vertical direction in FIG. 2); scanning signal lines 16$x$ and 16$y$ that extend in a row direction (horizontal direction in FIG. 2); pixels (101 to 104) that are aligned in the row and column directions; storage capacitor wires 18$p$ and 18$q$; and a common electrode (counter electrode) corn. Configurations of the pixels are identical to each other. Note that a pixel column including the pixels 101 and 102 is adjacent to a pixel column including the pixels 103 and 104, and a pixel row including the pixels 101 and 103 is adjacent to a pixel row including the pixels 102 and 104.

In the present liquid crystal panel, one pixel is associated with one data signal line, one scanning signal line, and one storage capacitor wire. Furthermore, one pixel includes two pixel electrodes that are aligned in a column direction.

For instance, in the pixel 101, a pixel electrode 17$a$ is connected to the data signal line 15$x$ via a transistor 12$a$ that is connected to the scanning signal line 16$x$, and the pixel electrode 17$a$ is connected to a pixel electrode 17$b$ via coupling capacitors Cab1 and Cab2. A storage capacitor Cha is formed between the pixel electrode 17$a$ and the storage capacitor wire 18$p$, and a storage capacitor Chb is formed between the pixel electrode 17$b$ and the storage capacitor wire 18$p$. A liquid crystal capacitor Cla is formed between the pixel electrode 17$a$ and the common electrode corn, and a liquid crystal capacitor Clb is formed between the pixel electrode 17$b$ and the common electrode corn. Note that the coupling capacitors Cab1 and Cab2 are in parallel.

In a liquid crystal display device including the present liquid crystal panel, when the scanning signal line 16$x$ is selected, the pixel electrode 17$a$ is connected to the data signal line 15$x$ (via the transistor 12$a$). Since the pixel electrode 17$a$ is coupled to the pixel electrode 17$b$ via the coupling capacitors Cab1 and Cab2, |Va|≧|Vb|, where Va is an electric potential of the pixel electrode 17$a$ after which the transistor 12$a$ is turned OFF, and Vb is an electric potential of the pixel electrode 17$b$ after which the transistor 12$a$ is turned OFF (note that, |Vb| for example denotes an electric potential difference between Vb and an electric potential of corn (=Vcom)). As a result, a sub-pixel including the pixel electrode 17$a$ becomes a bright sub-pixel and a sub-pixel including the pixel electrode 17$b$ becomes a dark sub-pixel, which allows halftone display by area coverage modulation of these bright sub-pixel and dark sub-pixel. Hence, it is possible to improve viewing angle characteristics of the present liquid crystal display device.

Figure 1:
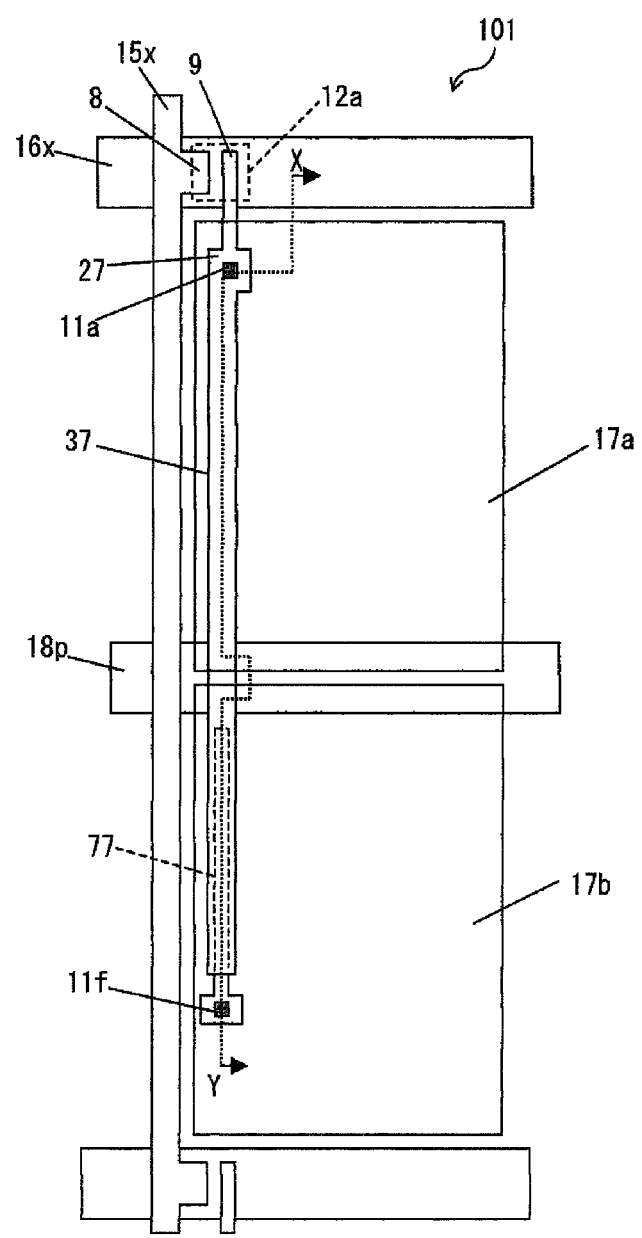
FIG. 1

FIG. 1 illustrates a specific example of the pixel 101 illustrated in FIG. 2. For easy viewing, FIG. 1 illustrates just members of the active matrix substrate, and members of a color filter substrate (counter substrate) are omitted in the drawing. As illustrated in FIG. 1, the transistor 12a is provided in the vicinity of an intersection of the data signal line 15x and the scanning signal line 16x; a source electrode 8 of the transistor 12a is connected to the data signal line 15x, the scanning signal line 16x serves also as a gate electrode of the transistor 12a, and a drain electrode 9 of the transistor 12a is connected to a drain draw-out electrode 27. In a pixel region partitioned by the two signal lines (15x and 16x), the pixel electrode 17a (first pixel electrode) disposed close to the transistor 12a and the pixel electrode 17b (second pixel electrode) are aligned in a column direction.

Furthermore, the drain draw-out electrode 27 is connected to the pixel electrode 17a via a contact hole 11a, as well as being connected to an upper layer capacitor electrode 37 (second capacitor electrode) in a same layer. The upper layer capacitor electrode 37 extends to the extent that the pixel electrode 17b overlaps the upper layer capacitor electrode 37. Further, a lower layer capacitor electrode 77 (first capacitor electrode) is provided so as to be overlapped by the pixel electrode 17b and the upper layer capacitor electrode 37, and the lower layer capacitor electrode 77 is connected to the pixel electrode 17b via a contact hole 11f. Note that the upper layer capacitor electrode 37 has its two edges disposed below the pixel electrode 17b, which edges run along the column direction, and the lower layer capacitor electrode 77 also has its two edges disposed below the pixel electrode 17b, which edges run along the column direction. From a plan view perspective, both edges of the lower layer capacitor electrode 77 are disposed on inner sides of respective edges of the upper layer capacitor electrode 37.

In the embodiment, the lower layer capacitor electrode 77 is provided in a same layer as the scanning signal line 16x, and the upper layer capacitor electrode 37 is provided in a same layer as the data signal line 15x. In a part in which the lower layer capacitor electrode 77, the upper layer capacitor electrode 37, and the pixel electrode 17b overlap, a gate insulating film is sandwiched between the lower layer capacitor electrode 77 and the upper layer capacitor electrode 37, and an interlayer insulating film is sandwiched between the upper layer capacitor electrode 37 and the pixel electrode 17b. As a result, a coupling capacitor Cab1 (see FIG. 2) is formed at a part in which the upper layer capacitor electrode 37 overlaps the lower layer capacitor electrode 77, and a coupling capacitor Cab2 (see FIG. 2) is formed at a part in which the pixel electrode 17b overlaps the upper layer capacitor electrode 37.

Moreover, a storage capacitor wire 18p is disposed so as to traverse the pixel region. The pixel electrode 17a and pixel electrode 17b overlap the storage capacitor wire 18p in such a manner that the gate insulating film and the interlayer insulating film are sandwiched between the storage capacitor wire 18p and the pixel electrode 17a or pixel electrode 17b. As a result, the storage capacitor Cha (see FIG. 2) is formed at a part in which the pixel electrode 17a overlaps the storage capacitor wire 18p, and the storage capacitor Chb (see FIG. 2) is formed at a part in which the pixel electrode 17b overlaps the storage capacitor wire 18p.

Figure 3:
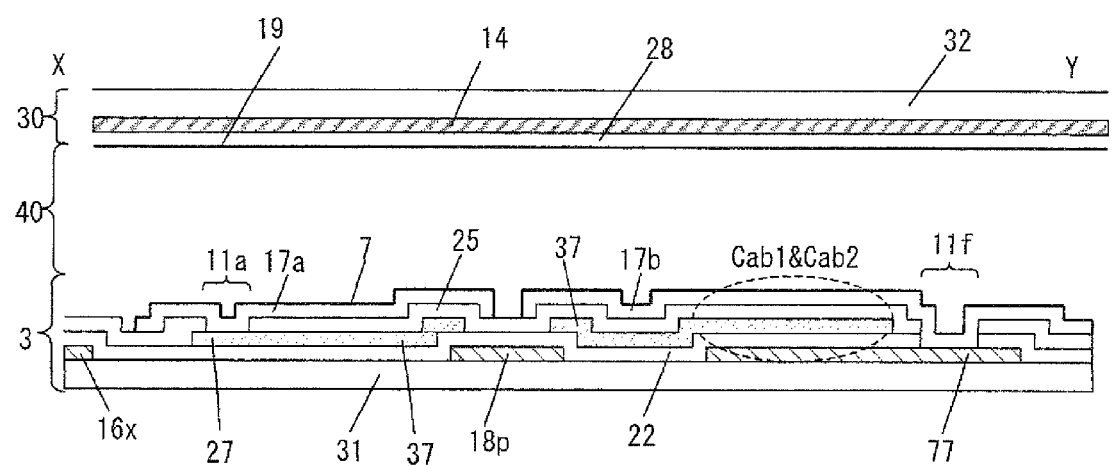
FIG. 3

FIG. 3 is a cross-sectional view taken on X-Y in FIG. 1. As illustrated in FIG. 3, the present liquid crystal panel includes an active matrix substrate 3, a color filter substrate 30 facing the active matrix substrate 3, and a liquid crystal layer 40 provided between the two substrates (3 and 30). The active matrix substrate 3 has the scanning signal line 16x, the storage capacitor wire 18p, and the lower layer capacitor electrode 77 provided on a glass substrate 31, and on these members, a gate insulating film 22 is provided so as to cover these members. The drain draw-out electrode 27 and the upper layer capacitor electrode 37 are provided in a layer upper of the gate insulating film 22. Although not included in the cross-section, a semiconductor layer (i layer and n+ layer), the source electrode 8 and drain electrode 9 which are in contact with the n+ layer, and the data signal line 15x are formed in the layer upper of the gate insulating film 22. Furthermore, the interlayer insulating film 25 (inorganic interlayer insulating film) is formed so as to cover this metal layer. The pixel electrodes 17a and 17b are formed on the interlayer insulating film 25, and an alignment film 7 is formed so as to cover these pixel electrodes. At the contact hole 11a, the interlayer insulating film 25 is hollowed through, thereby allowing the pixel electrode 17a to be connected to the upper layer capacitor electrode 37. Moreover, at the contact hole 11f, the gate insulating film 22 and interlayer insulating film 25 are hollowed through, thereby allowing the pixel electrode 17b to be connected to the lower layer capacitor electrode 77.

In the embodiment, the lower layer capacitor electrode 77 is overlapped by the upper layer capacitor electrode 37 in such a manner that the gate insulating film 22 is sandwiched between the lower layer capacitor electrode 77 and the upper layer capacitor electrode 37, and the coupling capacitor Cab1 (see FIG. 2) is formed at this overlapping part (77, 37). Furthermore, the upper layer capacitor electrode 37 is overlapped by the pixel electrode 17b in such a manner that the interlayer insulating film 25 is sandwiched between the upper layer capacitor electrode 37 and the pixel electrode 17b, and the coupling capacitor Cab2 (see FIG. 2) is formed at this overlapping part (37, 17b). Moreover, the storage capacitor wire 18p is overlapped by the pixel electrode 17a in such a manner that the gate insulating film 22 and the interlayer insulating film 25 are sandwiched between the storage capacitor wire 18p and the pixel electrode 17a; as a result, the storage capacitor Cha (see FIG. 2) is formed at this overlapping part (18p, 17a). Similarly, the storage capacitor wire 18p is overlapped by the pixel electrode 17b in such a manner that the gate insulating film 22 and the interlayer insulating film 25 are sandwiched between the storage capacitor wire 18p and the pixel electrode 17b; as a result, the storage capacitor Chb (see FIG. 2) is formed at this overlapping part (18p, 17b).

A material and thickness of the gate insulating film 22, and a material and thickness of the interlayer insulating film 25 are determined in consideration of (i) functions of the gate insulating film 22 as a gate insulating film, (ii) functions of the interlayer insulating film 25 as a channel protective film of a transistor, and further in consideration of (iii) a required coupling capacitance. In the embodiment, silicon nitride (SiNx) is used for each of the gate insulating film 22 and interlayer insulating film 25, and the interlayer insulating film 25 is formed thinner than the gate insulating film 22.

Meanwhile, the color filter substrate 30 has a colored layer (color filter layer) 14 provided on a glass substrate 32, and the common electrode (corn) 28 is provided in a layer upper of the colored layer 14. Furthermore, an alignment film 19 is formed on the common electrode 28 so as to cover the common electrode 28.

Figure 4:
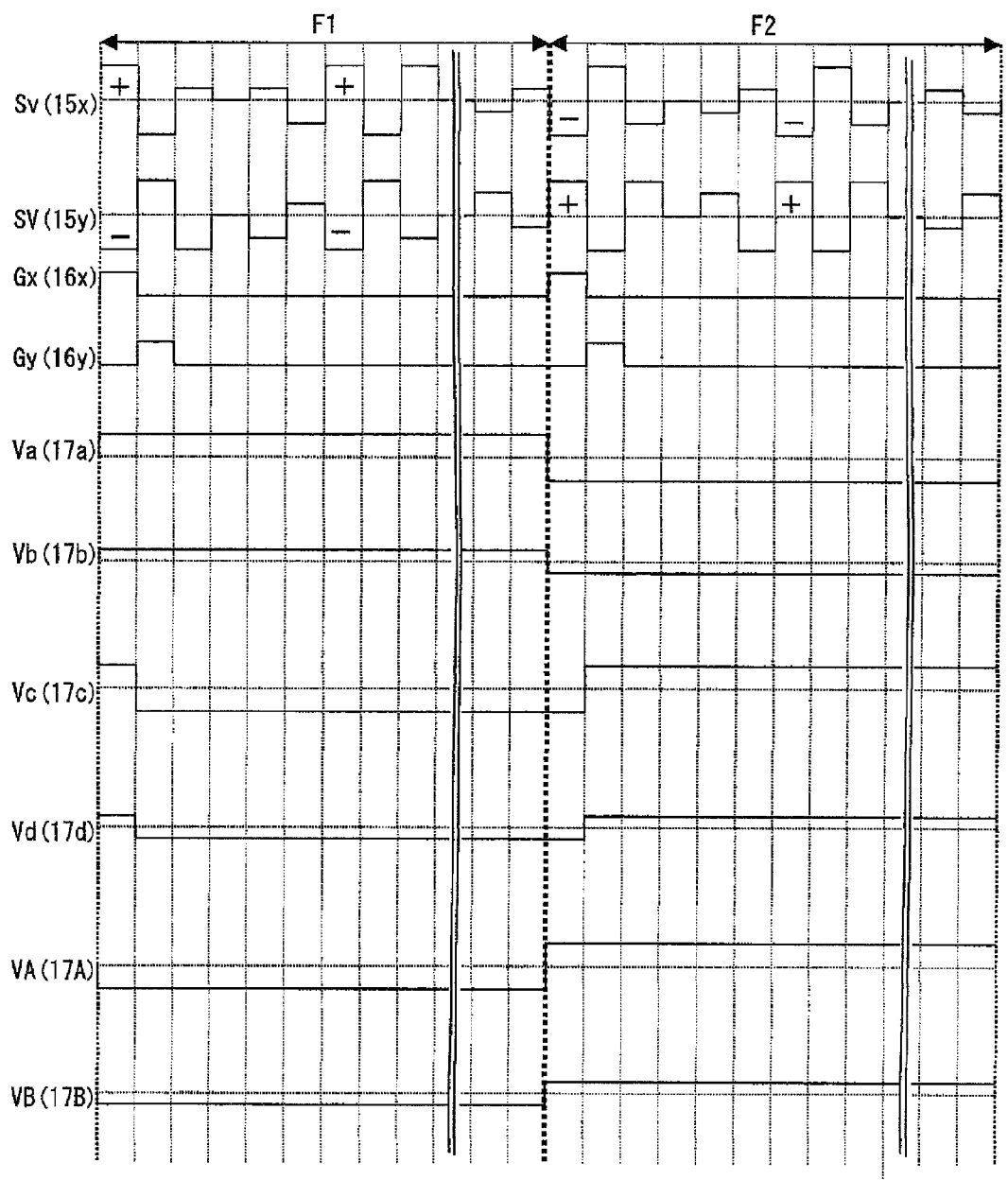
FIG. 4
Figure 5:
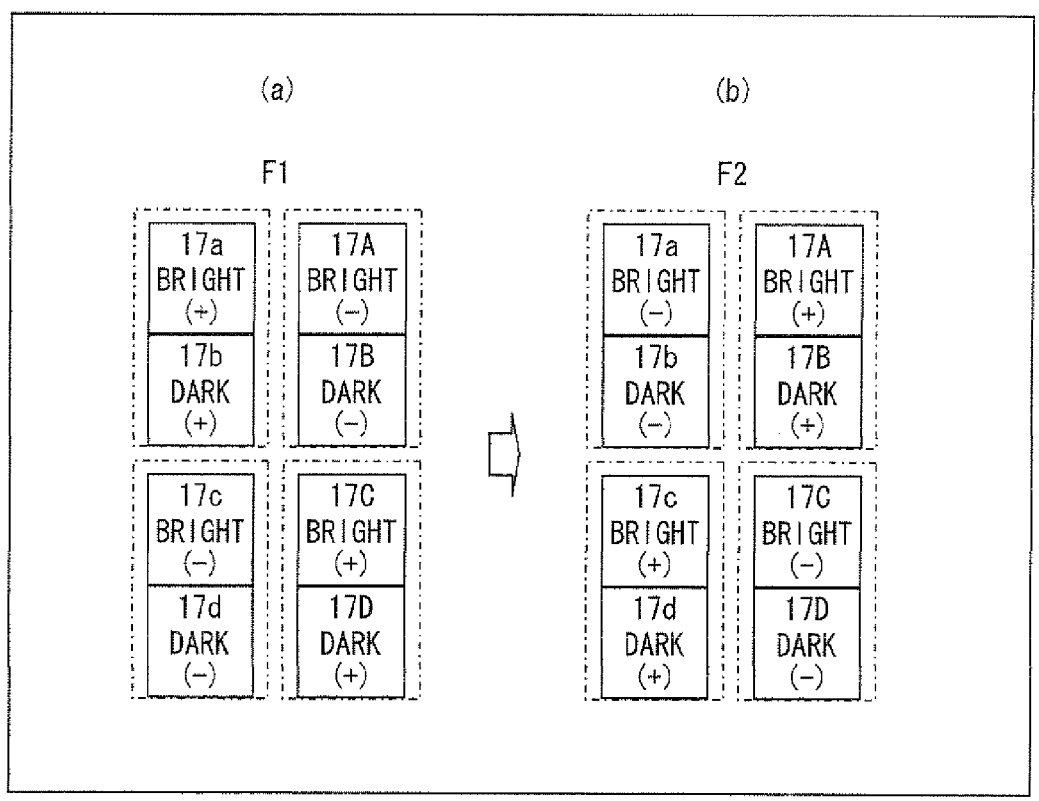
FIG. 5

FIG. 4 is a timing chart illustrating a driving method of the present liquid crystal display device (liquid crystal display device of a normally black mode) including the liquid crystal panel illustrated in FIGS. 1 and 2. Sv and SV are signal electric potentials that are supplied to the data signal lines 15x and 15*y* (see FIG. 2), respectively; Gx and Gy are gate on-pulse signals that are supplied to the scanning signal lines 16*x* and 16*y*, respectively; Va to Vd are electric potentials of the pixel electrodes 17*a* to 17*d*, respectively; and VA and AB are electric potentials of the pixel electrodes 17A and 17B, respectively.

As illustrated in FIG. 4, with this driving method, scanning signal lines are successively selected, to (i) invert a polarity of a signal electric potential to be supplied to the data signal line per one horizontal scanning period (1H), and (ii) invert a polarity of a signal electric potential that is supplied to each of horizontal scanning periods having an identical ordinal number in the respective frames per units of one frame. Further, signal electric potentials of opposite polarities are supplied to two adjacent data signal lines in the one identical horizontal scanning period.

More specifically, in a case of consecutive frames F1 and F2, in F1, a scanning signal line is successively selected; to one of two adjacent data signal lines, a signal electric potential of a positive polarity is supplied in a first horizontal scanning period (e.g., including a write-in period of the pixel electrode 17*a*), and a signal electric potential of a negative polarity is supplied in a second horizontal scanning period; to the other one of the two data signal lines, a signal electric potential of a negative polarity is supplied in the first horizontal scanning period, and a signal electric potential of a positive polarity is supplied in the second horizontal scanning period. As a result, $|Va| \geqq |Vb|$ and $|Vc| \geqq |Vd|$, as illustrated in FIG. 4; for example, a sub-pixel including the pixel electrode 17*a* (positive polarity) becomes a bright sub-pixel (hereinafter, "bright"), a sub-pixel including the pixel electrode 17*b* (positive polarity) becomes a dark sub-pixel (hereinafter, "dark"), a sub-pixel including the pixel electrode 17*c* (negative polarity) becomes "bright", and a sub-pixel including the pixel electrode 17*d* (negative polarity) becomes "dark". As a whole, the sub-pixels become as illustrated in (a) of FIG. 5.

Moreover, in F2, a scanning signal line is successively selected; to one of two adjacent data signal lines, a signal electric potential of a negative polarity is supplied in a first horizontal scanning period (e.g., including a write-in period of the pixel electrode 17*a*), and a signal electric potential of a positive polarity is supplied in a second horizontal scanning period; to the other one of the two data signal lines, a signal electric potential of a positive polarity is supplied in the first horizontal scanning period, and a signal electric potential of a negative polarity is supplied in the second horizontal scanning period. As a result, $|Va| \geqq |Vb|$ and $|Vc| \geqq |Vd|$, as illustrated in FIG. 4; for example, the sub-pixel including the pixel electrode 17*a* (negative polarity) becomes "bright", the sub-pixel including the pixel electrode 17*b* (negative polarity) becomes "dark", the sub-pixel including the pixel electrode 17*c* (positive polarity) becomes "bright", and the sub-pixel including the pixel electrode 17*d* (positive polarity) becomes "dark". As a whole, the sub-pixels become as illustrated in (b) of FIG. 5.

Although the alignment control structure is omitted in FIGS. 1 and 3, for example with a liquid crystal panel of a MVA (Multidomain Vertical Alignment) mode, slits for alignment controlling are provided on each of pixel electrodes of the active matrix substrate, and ribs for alignment controlling are provided on the color filter substrate. Instead of the rib, a slit for alignment controlling may be provided on the common electrode of the color filter substrate.

The liquid crystal panel illustrated in FIG. 1 has the coupling capacitor Cab1 (coupling capacitor at a part in which the upper layer capacitor electrode 37 overlaps the lower layer capacitor electrode 77) and the coupling capacitor Cab2 (coupling capacitor at a part in which the pixel electrode 17*b* overlaps the upper layer capacitor electrode 37) formed in a thickness direction of the substrate, and the coupling capacitors Cab1 and Cab2 are parallelized. This allows connecting the pixel electrodes 17*a* and 17*b* via the parallelized coupling capacitors Cab1 and Cab2. As a result, it is possible to increase the aperture ratio by reducing an area of the upper layer capacitor electrode 37 without causing a change in the coupling capacitance, and to increase the coupling capacitance without changing the area of the upper layer capacitor electrode 37 (without changing the aperture ratio).

Moreover, with the present liquid crystal panel, silicon nitride (SiNx) is used for each of the gate insulating film 22 and the interlayer insulating film 25, and the interlayer insulating film 25 is formed thinner than the gate insulating film 22. The thickness of the gate insulating film 22 effects largely on transistor properties, and it is not preferable to largely change its thickness to attain the effect of increasing the aperture ratio or increasing the coupling capacitance. On the other hand, the thickness of the interlayer insulating film 25 (channel protective film) effects relatively small on the transistor properties. Hence, to enhance the foregoing effect while maintaining the transistor properties, it is preferable to reduce the thickness of the interlayer insulating film 25, and is preferable, as in the present liquid crystal panel, to make the thickness of the interlayer insulating film 25 thinner than that of the insulating film 22.

Moreover, since both the edges of the lower layer capacitor electrode 77 are disposed on the inner sides of respective edges of the upper layer capacitor electrode 37 from a plan view perspective of the present liquid crystal panel, the coupling capacitance is difficult to change even if alignment of the lower layer capacitor electrode 77 or upper layer capacitor electrode 37 shifts in the row direction (is tolerant against alignment shift). In a viewpoint of being tolerant against alignment shifts, both the edges of the upper layer capacitor electrode 37 may be disposed on the inner sides of respective edges of the lower layer capacitor electrode 77. However, as illustrated in FIG. 1, by having the upper layer capacitor electrode 37 have a wide width, which upper layer capacitor electrode 37 forms a coupling capacitor with both the lower layer capacitor electrode 77 and the pixel electrode 17*b*, it is possible to enhance the effects such as increasing the aperture ratio or increasing the coupling capacitance, even more.

If the upper layer capacitor electrode 37 and the lower layer capacitor electrode 77 short-circuit in FIGS. 1 and 3, the pixel electrode 17*a* and the pixel electrode 17*b* also short-circuit. However, in such a case, it is possible to repair the short-circuit while maintaining the coupling capacitor Cab2 (coupling capacitor between the upper layer capacitor electrode 37 and the pixel electrode 17*b*) by trimming to remove a part of the pixel electrode 17*b* which part is disposed inside the contact hole 11*f*.

Next described is a manufacturing method of the present liquid crystal panel. The manufacturing method of the liquid crystal panel includes a step of manufacturing an active matrix substrate, a step of manufacturing a color filter substrate, and a step of assembling by adhering the two substrates together and filling liquid crystal between the two substrates.

First, on a substrate made of glass, plastic or the like, a metal film made of titanium, chrome, aluminum, molybdenum, tantalum, tungsten, copper or like metal, an alloy film of these metal, or a laminated film of these metal (having a thickness of 1000 Å to 3000 Å) is formed by sputtering, and thereafter patterning is performed by a photolithography technique (Photo Engraving Process, called "PEP technique") to form the scanning signal line (gate electrode of transistor), storage capacitor wire, and lower layer capacitor electrode.

Next, onto the entire substrate on which the scanning signal line and the like are formed, an inorganic insulating film (having a thickness of around 4000 Å) made of silicon nitride, oxide silicon or like material is formed by CVD (Chemical Vapor Deposition), to form a gate insulating film.

Subsequently, on the gate insulating film (entire substrate), an intrinsic amorphous silicon film (having a thickness of 1000 Å to 3000 Å) and a n+ amorphous silicon film (having a thickness of 400 Å to 700 Å) on which phosphorus is doped are successively formed by CVD, and thereafter patterning is performed by the PEP technique to form, on the gate electrode, an island-shaped silicon laminate made up of the intrinsic amorphous silicon layer and the n+ amorphous silicon layer.

Thereafter, on the entire substrate on which the silicon laminate is formed, a metal film made of titanium, chrome, aluminum, molybdenum, tantalum, tungsten, copper or like metal, an alloy film of these metals, or a laminated film of these metals (having a thickness of 1000 Å to 3000 Å) is formed by sputtering. Subsequently, patterning is performed by the PEP technique to form the data signal line, the source electrode and drain electrode of the transistor, the drain draw-out electrode, and the upper layer capacitor electrode (forming a metal layer).

Furthermore, the n+ amorphous silicon layer included in the silicon laminate is removed by etching in such a manner that the source electrode and the drain electrode serve as a mask, thereby forming a channel of the transistor. Here, the semiconductor layer may be formed of the amorphous silicon film as described above, however may also be formed by forming a polysilicon film. Furthermore, the amorphous silicon film or the polysilicon film may undergo a laser annealing process to improve its crystallinity. This as a result quickens the moving rate of electrons within the semiconductor layer and improves the properties of the transistor (TFT).

Next, on the entire substrate on which the data signal lines and the like are formed, an inorganic insulating film (having a thickness of around 3000 Å) made of silicon nitride, oxide silicon or the like is formed by CVD, to form the interlayer insulating film.

Thereafter, the interlayer insulating film or the interlayer insulating film and gate insulating film are removed by etching with the PEP technique, to open a contact hole. In the part in which the contact hole 11a is opened in FIGS. 1 and 3, the interlayer insulating film is removed, and in the part in which the contact hole 11f is opened, the interlayer insulating film and the gate insulating film are removed.

Subsequently, on the entire substrate on which the interlayer insulating film is formed and in which the contact holes are opened, a transparent conductive film (having a thickness of 1000 Å to 2000 Å) made of ITO (Indium Tin Oxide), IZO (Indium Zinc Oxide), zinc oxide, tin oxide, or like material is formed by sputtering, and thereafter patterning is performed by the PEP technique, thereby forming the pixel electrodes.

Finally, polyimide resin is printed on the entire substrate on which the pixel electrodes are formed, so as to have a thickness of 500 Å to 1000 Å. Thereafter, this resin is baked and then rubbed in one direction using a rotating cloth, to form an alignment film. As a result of the above, the active matrix substrate is manufactured.

The following description deals with the step of manufacturing the color filter substrate.

First, on a substrate (entire substrate) made of glass, plastic, or like material, a chrome thin film or a film made of resin including black pigment is formed. Thereafter, patterning is performed by the PEP technique, to form a black matrix. Next, in gaps of the black matrix, a color filter layer of red, green, and blue (having a thickness of around 2 µm) is formed by patterning, by use of pigment dispersion or like technique.

Subsequently, on the entire substrate on which the color filter layer is formed, a transparent conductive film (having a thickness of around 1000 Å) made of ITO, IZO, zinc oxide, tin oxide or like material is formed, to form a common electrode (corn).

Finally, on the entire substrate on which the common electrode is provided, polyimide resin is printed so as to have a thickness of 500 Å to 1000 Å, and thereafter the polyimide resin is baked and then rubbed in one direction by use of a rotating cloth, to form an alignment film. As a result of the above, the color filter substrate is manufactured.

The following description deals with the step of assembling.

First, on one of the active matrix substrate and color filter substrate, sealing material made of thermosetting epoxy resin or like material is applied by screen printing to a frame pattern of which a part of a liquid crystal injection opening is opened; and to the other one of the substrates, spherical spacers made of plastic or silica is dispersed, which spacers have a diameter corresponding to the thickness of the liquid crystal layer.

Next, the active matrix substrate and the color filter substrate are adhered together, and the sealing material is cured.

Finally, in a space surrounded by the active matrix substrate, the color filter substrate, and the sealing material, liquid crystal material is injected by a decompression procedure. Thereafter, UV curable resin is applied to the liquid crystal injection opening, to seal the liquid crystal material by UV irradiation, thereby forming the liquid crystal layer. As a result of the above, the liquid crystal panel is manufactured.

Figure 6:
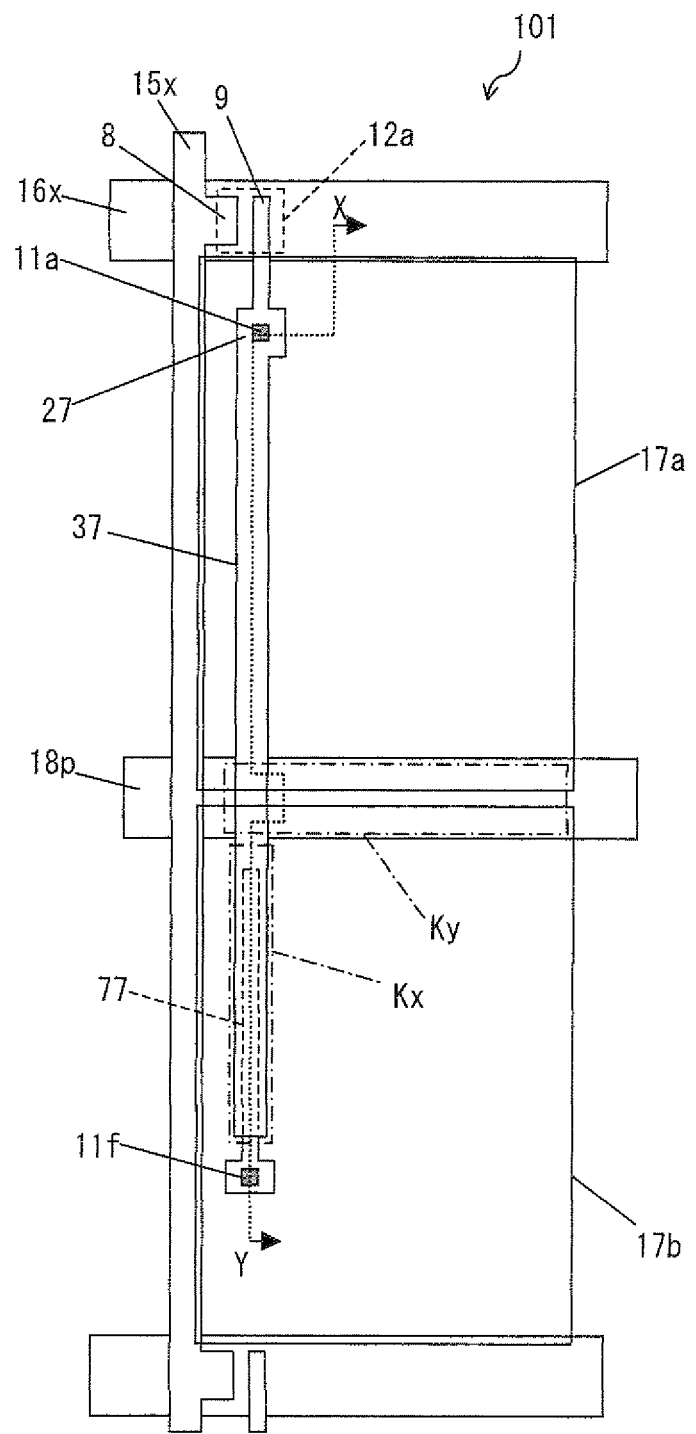
FIG. 6
Figure 7:
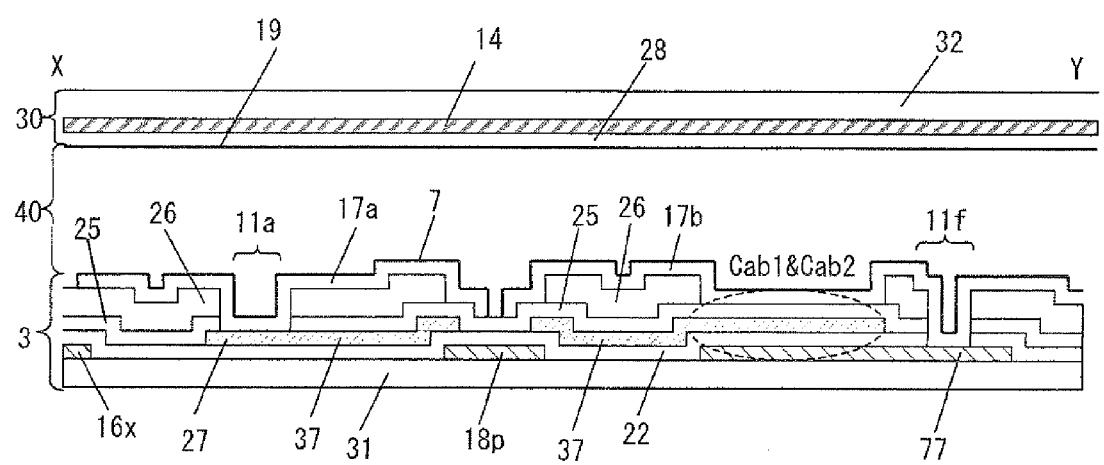
FIG. 7

Looking back at FIG. 3, the interlayer insulating film (inorganic interlayer insulating film) 25 illustrated in FIG. 3 may have an organic interlayer insulating film 26 be provided on the interlayer insulating film 25, which organic interlayer insulating film 26 is thicker than the interlayer insulating film 25. This attains a double-layered channel protective film (25, 26) as illustrated in FIG. 7. This configuration allows attainment of effects such as reduction in various parasitic capacitance, prevention of short-circuiting between wires, and reduction of breakage of pixel electrodes due to reduction in thickness. In this case, as illustrated in FIGS. 6 and 7, it is preferable that the organic interlayer insulating film 26 be hollowed through at a part Kx where the pixel electrode 17b overlaps the upper layer capacitor electrode 37. This allows attainment of the foregoing effect while sufficiently securing the coupling capacitance. Moreover, it is preferable with the organic interlayer insulating film 26 that a part Ky overlapping the storage capacitor wire 18p is hollowed through. This allows attaining the foregoing effect while sufficiently securing the storage capacitance. Moreover, the present configuration allows reduction of the parasitic capacitance between the scanning signal line and pixel electrode and reduction of the parasitic capacitance between the data signal line and pixel electrode. Hence, as illustrated in FIGS. 6 and 7, it is possible to increase the aperture ratio by having the pixel electrode overlap the data signal line and the scanning signal line.

The interlayer insulating film (inorganic interlayer insulating film) 25, the organic interlayer insulating film 26, and the contact holes 11a and 11f each illustrated in FIG. 7 may be formed as described below, for example. Namely, after the transistor and the data signal lines are formed, the interlayer insulating film 25 (passivation film) made of SiNx having a thickness of approximately 3000 Å is formed by CVD, so as to cover the entire substrate, by use of a mixed gas including SiH$_4$ gas, NH$_3$ gas, and N$_2$ gas. Thereafter, the organic interlayer insulating film 26 made of positive type photosensitive acrylic resin having a thickness of approximately 3 μm is formed by spin coating or die coating. Subsequently, hollowed parts and various contacting patterns on the organic interlayer insulating film 26 are formed by photolithography, and further the interlayer insulating film 25 is dry etched by use of a mixed gas including CF$_4$ gas and O$_2$ gas in such a manner that the patterned organic interlayer insulating film 26 is served as a mask. More specifically, for example, for the hollowed part of the organic interlayer insulating film, half exposure is carried out in the photolithography step so that at a time when the developing is completed, a thin organic interlayer insulating film remains, whereas for the contact hole part, full exposure is carried out in the photolithography step so that at the time when the developing is completed, no organic interlayer insulating film remains. Here; upon performing the dry etching by use of the mixed gas including CF$_4$ gas and O$_2$ gas, the hollowed part of the organic interlayer insulating film has its remaining film (of the organic interlayer insulating film) be removed, the part of the contact hole 11*a* has the interlayer insulating film 25 provided below the organic interlayer insulating film be removed, and the part of the contact hole 11*f* has the interlayer insulating film 25 and gate insulating film 22 provided below the organic interlayer insulating film be removed. That is to say, in the part of the contact hole 11*a*, the etching is terminated by having the interlayer insulating film 25 be removed and have a surface of the drain draw-out electrode 27 (e.g., Al film) be exposed, and in the part of the contact hole 11*f*, the etching is terminated by having the interlayer insulating film 25 and gate insulating film 22 be removed and a surface of the lower layer capacitor electrode 77 (e.g., Al film) be exposed. Note that the organic interlayer insulating film 26 may be an insulating film made of, for example, SOG (spin-on glass) material, and the organic interlayer insulating film 26 may include at least one of acrylic resin, epoxy resin, polyimide resin, polyurethane resin, novolac resin, and siloxane resin.

Looking back at FIG. 1, the upper layer capacitor electrode 37 extends from the drain draw-out electrode 27 to the pixel electrode 17*b* in FIG. 1. However, the upper layer capacitor electrode 37 may also be shortened as in FIG. 8. More specifically, the drain draw-out electrode 27 is connected to the pixel electrode 17*a* via the contact hole 11*a*, whereas the upper layer capacitor electrode 37 is connected to the pixel electrode 17*a* at a part close to the pixel electrode 17*b*, via a contact hole 11*i*. This shortens the upper layer capacitor electrode 37, thereby allowing an increase in aperture ratio.

Figure 9:
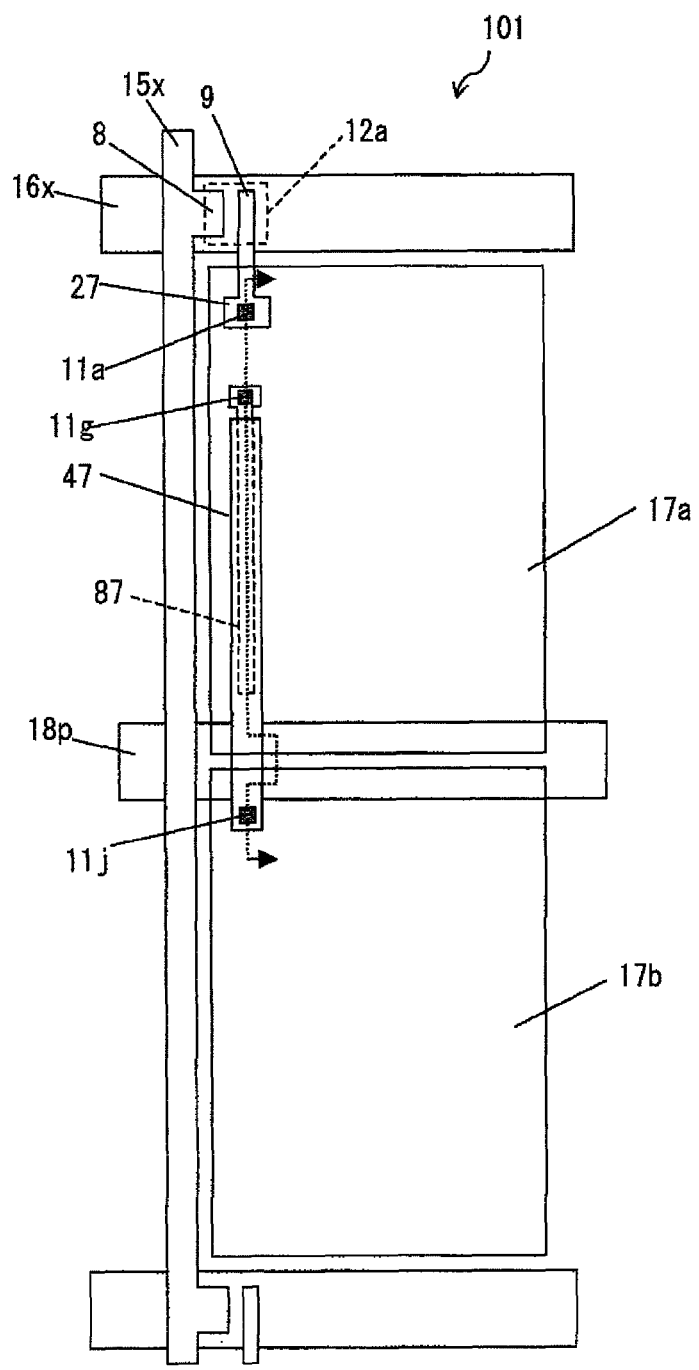
FIG. 9

Another specific example of the pixel 101 illustrated in FIG. 2 is illustrated in FIG. 9. In FIG. 9, the transistor 12*a* is disposed in the vicinity of an intersection of the data signal line 15*x* and the scanning signal line 16*x*. A source electrode 8 of the transistor 12*a* is connected to the data signal line 15*x*, the scanning signal line 16*x* serves also as a gate electrode of the transistor 12*a*, and a drain electrode 9 of the transistor 12*a* is connected to the drain draw-out electrode 27. In a pixel region partitioned by the two signal lines (15*x* and 16*x*), a pixel electrode 17*a* (first pixel electrode) disposed close to the transistor 12*a* and a pixel electrode 17*b* (second pixel electrode) are aligned in a column direction.

An upper layer capacitor electrode 47 connected to the pixel electrode 17*b* via a contact hole 11*j* extends so as to be overlapped by the pixel electrode 17*a*, and further the lower layer capacitor electrode 87 is provided so as to be overlapped by the pixel electrode 17*a* and the upper layer capacitor electrode 47. The lower layer capacitor electrode 87 is connected to the pixel electrode 17*a* via a contact hole 11*g*. Moreover, the pixel electrode 17*a* is connected to the drain draw-out electrode 27 via a contact hole 11*a*.

The upper layer capacitor electrode 47 has two edges disposed below the pixel electrode 17*a*, which edges run along the column direction, and the lower layer capacitor electrode 87 also has two edges disposed below the pixel electrode 17*a*, which edges run along the column direction. From a plan view perspective, both of the edges of the lower layer capacitor electrode 87 are disposed on inner sides of respective edges of the upper layer capacitor electrode 47.

In the embodiment, the lower layer capacitor electrode 87 is formed in a same layer as the scanning signal line 16*x*, and the upper layer capacitor electrode 47 is formed in a same layer as the data signal line 15*x*. In a part where the lower layer capacitor electrode 87, the upper layer capacitor electrode 47, and the pixel electrode 17*a* overlap, a gate insulating film is sandwiched between the lower layer capacitor electrode 87 and the upper layer capacitor electrode 47, and an interlayer insulating film is sandwiched between the upper layer capacitor electrode 47 and the pixel electrode 17*a*. This as a result forms a coupling capacitor Cab1 at a part in which the upper layer capacitor electrode 47 overlaps the lower layer capacitor electrode 87, and forms a coupling capacitor Cab2 at a part in which the pixel electrode 17*a* overlaps the upper layer capacitor electrode 47.

Moreover, the storage capacitor wire 18*p* is disposed so as to traverse the pixel region. The storage capacitor wire 18*p* is disposed so as to be overlapped by the pixel electrode 17*a* and the pixel electrode 17*b* in such a manner that the gate insulating film and the interlayer insulating film are sandwiched between the storage capacitor wire 18*p* and the pixel electrode 17*a* or pixel electrode 17*b*. As a result, the storage capacitor Cha is formed at a part in which the pixel electrode 17*a* overlaps the storage capacitor wire 18*p*, and the storage capacitor Chb is formed at a part in which the pixel electrode 17*b* overlaps the storage capacitor wire 18*p*.

Figure 10:
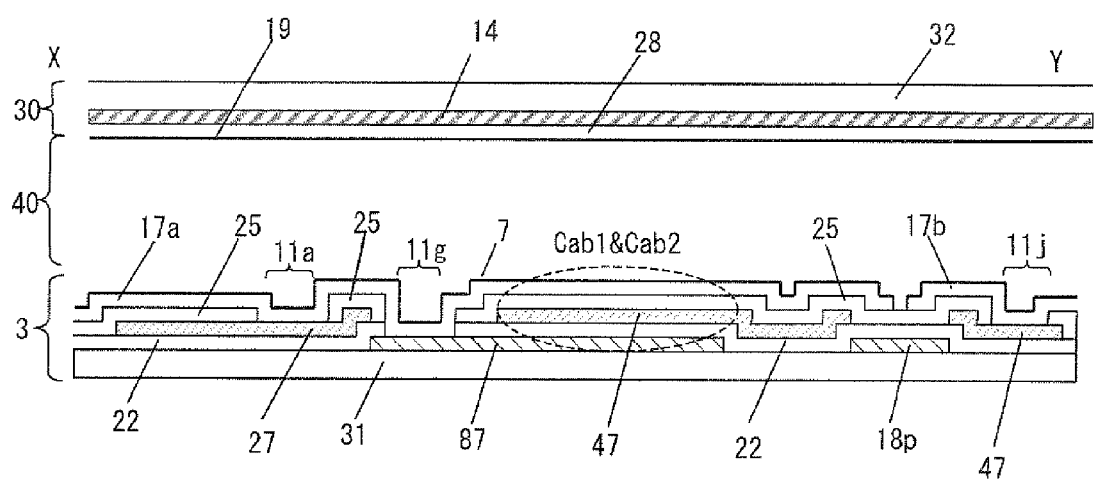
FIG. 10

FIG. 10 is a cross-sectional view taken on X-Y in FIG. 9. As illustrated in FIG. 10, the present liquid crystal panel includes the active matrix substrate 3, a color filter substrate 30 facing the active matrix substrate 3, and a liquid crystal layer 40 disposed between the two substrates (3 and 30). The active matrix substrate 3 has the storage capacitor wire 18*p* and the lower layer capacitor electrode 87 formed on a glass substrate 31, and a gate insulating film 22 is formed so as to cover the storage capacitor wire 18*p* and the lower layer capacitor electrode 87. In a layer upper of the gate insulating film 22, the upper layer capacitor electrode 47 and the drain draw-out electrode 27 are formed. Furthermore, the interlayer insulating film 25 is formed so as to cover this metal layer. The pixel electrodes 17*a* and 17*b* are formed on the interlayer insulating film 25, and furthermore an alignment film 7 is formed so as to cover the pixel electrodes. At the contact hole 11*j*, the interlayer insulating film 25 is hollowed through, which as a result connects the pixel electrode 17*b* to the upper layer capacitor electrode 47. Moreover, at the contact hole 11*a*, the interlayer insulating film 25 is hollowed through, which as a result connects the pixel electrode 17*a* to the drain draw-out electrode 27. Furthermore, at the contact hole 11*g*, the interlayer insulating film 25 and the gate insulating film 22 are hollowed through, which as a result connects the lower layer capacitor electrode 87 to the pixel electrode 17*a*.

In the embodiment, the lower layer capacitor electrode 87 is overlapped by the upper layer capacitor electrode 47 in such a manner that the gate insulating film 22 is sandwiched between the lower layer capacitor electrode 87 and the upper layer capacitor electrode 47. At this overlapping part (87 and 47), the coupling capacitor Cab1 (see FIG. 2) is formed. Furthermore, the upper layer capacitor electrode 47 is overlapped by the pixel electrode 17a in such a manner that the interlayer insulating film 25 is sandwiched between the upper layer capacitor electrode 47 and the pixel electrode 17a, and at this overlapping part (47 and 17a), the coupling capacitor Cab2 (see FIG. 2) is formed. Moreover, the storage capacitor wire 18p is overlapped by the pixel electrode 17a in such a manner that the gate insulating film 22 and the interlayer insulating film 25 are sandwiched between the storage capacitor wire 18p and the pixel electrode 17a, and at this overlapping part (18p and 17a), the storage capacitor Cha (see FIG. 2) is formed. Similarly, the storage capacitor wire 18p is overlapped by the pixel electrode 17b in such a manner that the gate insulating film 22 and the interlayer insulating film 25 are sandwiched between the storage capacitor wire 18p and the pixel electrode 17b, and at this overlapping part (18p and 17b), the storage capacitor Chb (see FIG. 2) is formed.

The configuration of FIG. 9 not only attains the effect of increasing the aperture ratio and increasing the coupling capacitance, but also attains a merit that by connecting the lower layer capacitor electrode 87 to not the pixel electrode 17b but to the pixel electrode 17a, it is possible to hold down occurrence of image sticking of the pixel electrode 17b which is in an electrically floating state.

Figure 11:
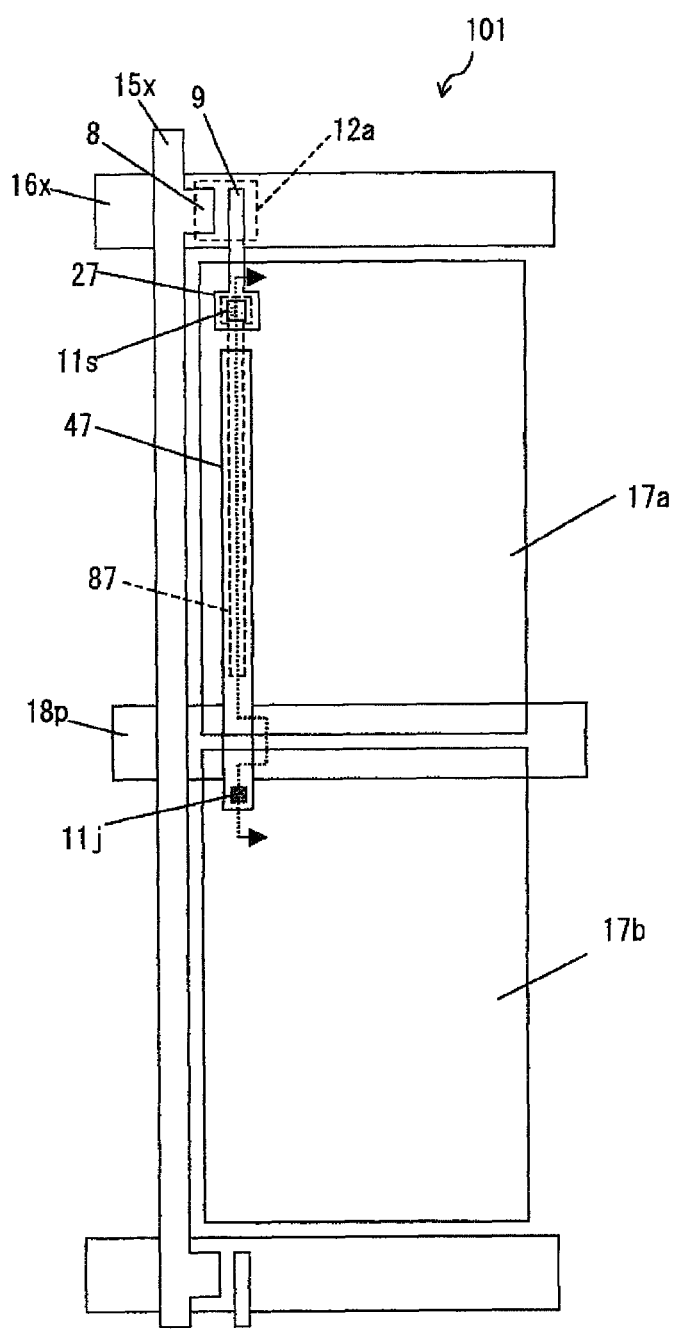
FIG. 11

The liquid crystal panel illustrated in FIG. 9 may also be configured as illustrated in FIG. 11. Namely, the lower layer capacitor electrode 87 is extended to a position where the lower layer capacitor electrode 87 is overlapped by the drain draw-out electrode 27, and the lower layer capacitor electrode 87, the drain draw-out electrode 27, and the pixel electrode 17a are connected via a contact hole 11s. This allows bringing the two contact holes (11a and 11g) in FIG. 9 together into one contact hole (11s). Liquid crystal orientation at a part at which the contact hole is provided easily falls into disarray caused by its unevenness in level, and this possibly can be visualized; however, by bringing the contact hole together into one as described above, the region in which the liquid crystal orientation falls into disarray is reduced, thereby allowing improvement in display quality. In a case where such a disarray in liquid crystal orientation is hidden by use of a light-shielding film (e.g., black matrix) or is hidden by broadening the lower layer capacitor electrode, bringing the contact holes together as one allows reduction of a region that is light-shielded, thereby allowing an increase in aperture ratio.

Figure 12:
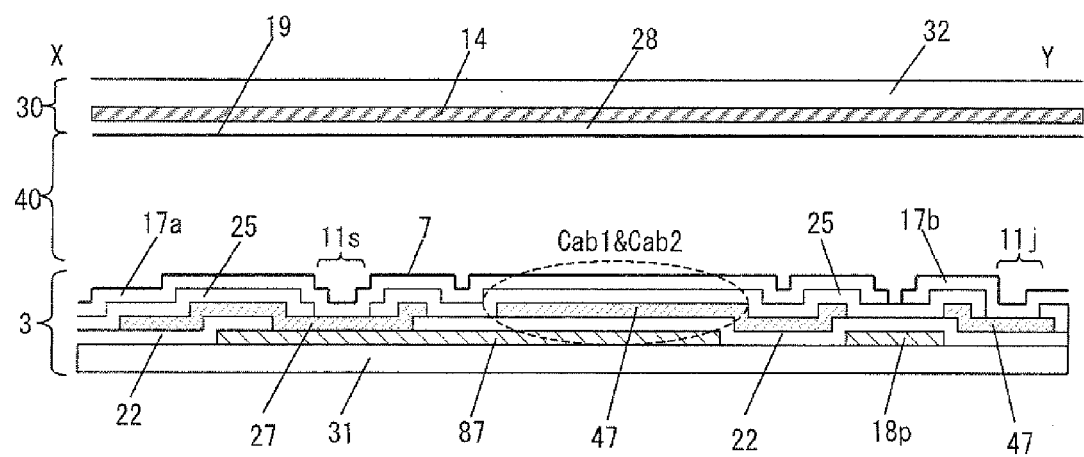
FIG. 12

FIG. 12 is a cross-sectional view taken on X-Y in FIG. 11. As illustrated in FIG. 12, in the contact hole 11j, the interlayer insulating film 25 is hollowed through, which as a result connects the pixel electrode 17b to the upper layer capacitor electrode 47. Moreover, in the contact hole 11s, the interlayer insulating film 25 and the gate insulating film 22 are hollowed through, which as a result connects the lower layer capacitor electrode 87, the drain draw-out electrode 27, and the pixel electrode 17a. Note that in the part at which the contact hole 11s is formed, the gate insulating film 22 is to be removed by etching for example by the PEP technique, before forming the drain draw-out electrode 27.

Figure 13:
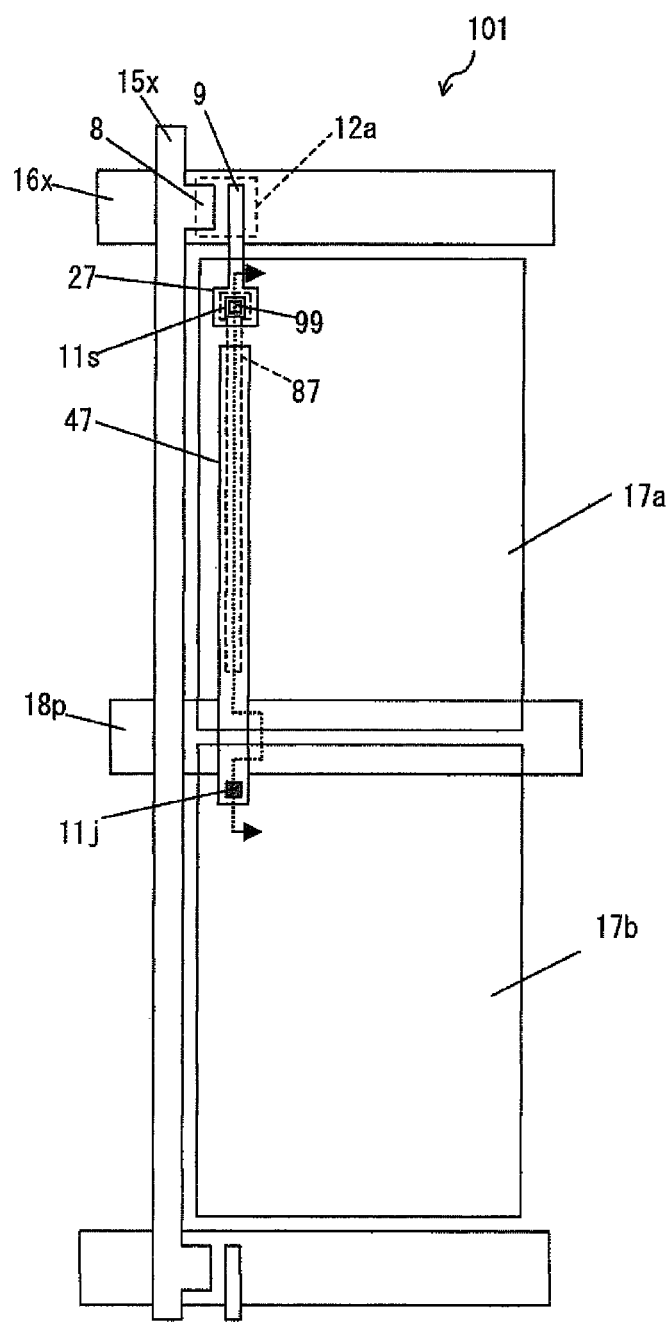
FIG. 13
Figure 14:
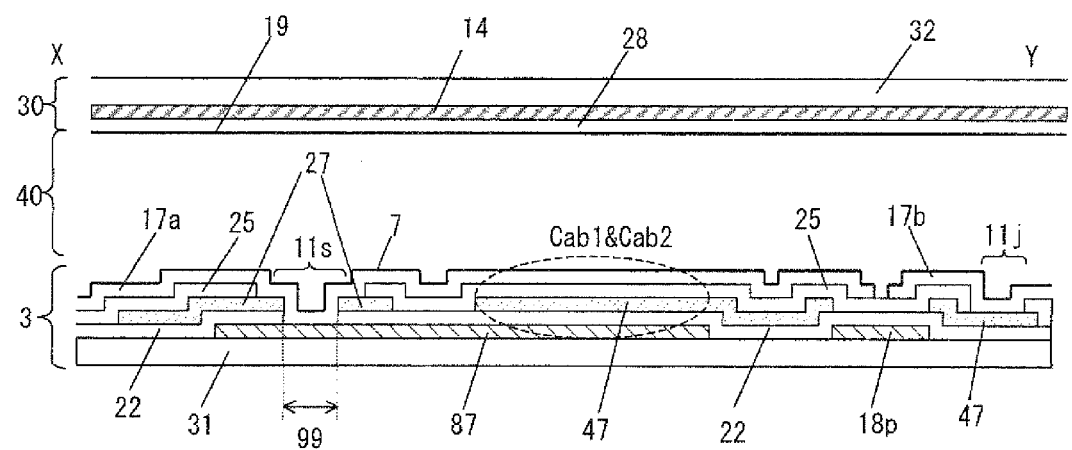
FIG. 14

The liquid crystal panel of FIG. 11 may be configured as illustrated in FIG. 13. Namely, a hollowed section 99 is opened in the drain draw-out electrode 27 in such a manner that a part of the opening of the contact hole 11s is overlapped. For instance, the hollowed section 99 and contact hole 11s are opened so that an outer circumference of the hollow section 99 is disposed inside of an outer circumference of the opening of the contact hole 11s. This allows simultaneously opening the contact holes 11s and 11j without performing etching of the gate insulating film 22 by the PEP technique, which etching is required in the configuration of FIGS. 11 and 12 (prior to forming the drain draw-out electrode 27).

For example, in a case where a mixed gas including $CF_4$ gas and $O_2$ gas is used in etching the interlayer insulating film, etching is terminated by having the interlayer insulating film 25 be removed at a part in which the contact hole 11j is opened and a surface (e.g., Al) of the drain draw-out electrode 27 is exposed, and at a part in which the hollow section 99 is opened, etching is terminated by having the interlayer insulating film 25 and gate insulating film 22 be removed and a surface (e.g., Al) of the lower layer capacitor electrode 87 is exposed. Moreover, by this step, it is possible to remove the gate insulating film and interlayer insulating film provided in a layer upper of an end section of the scanning signal line to expose the end section of the scanning signal line (to connect the end section of the scanning signal line to an external connection terminal). As an etchant, a buffered HF (BHF) which mixes hydrofluoric acid (HF) with ammonium fluoride ($NH_4F$) may also be used, other than the mixed gas.

Figure 8:
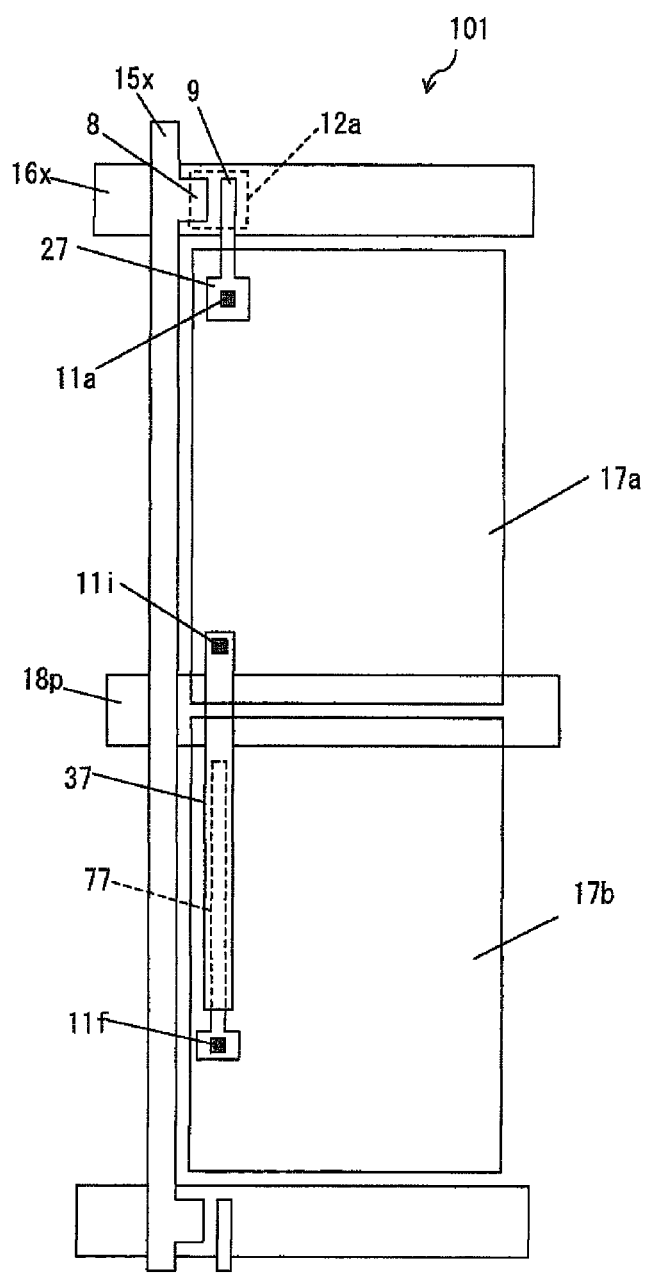
FIG. 8
Figure 15:
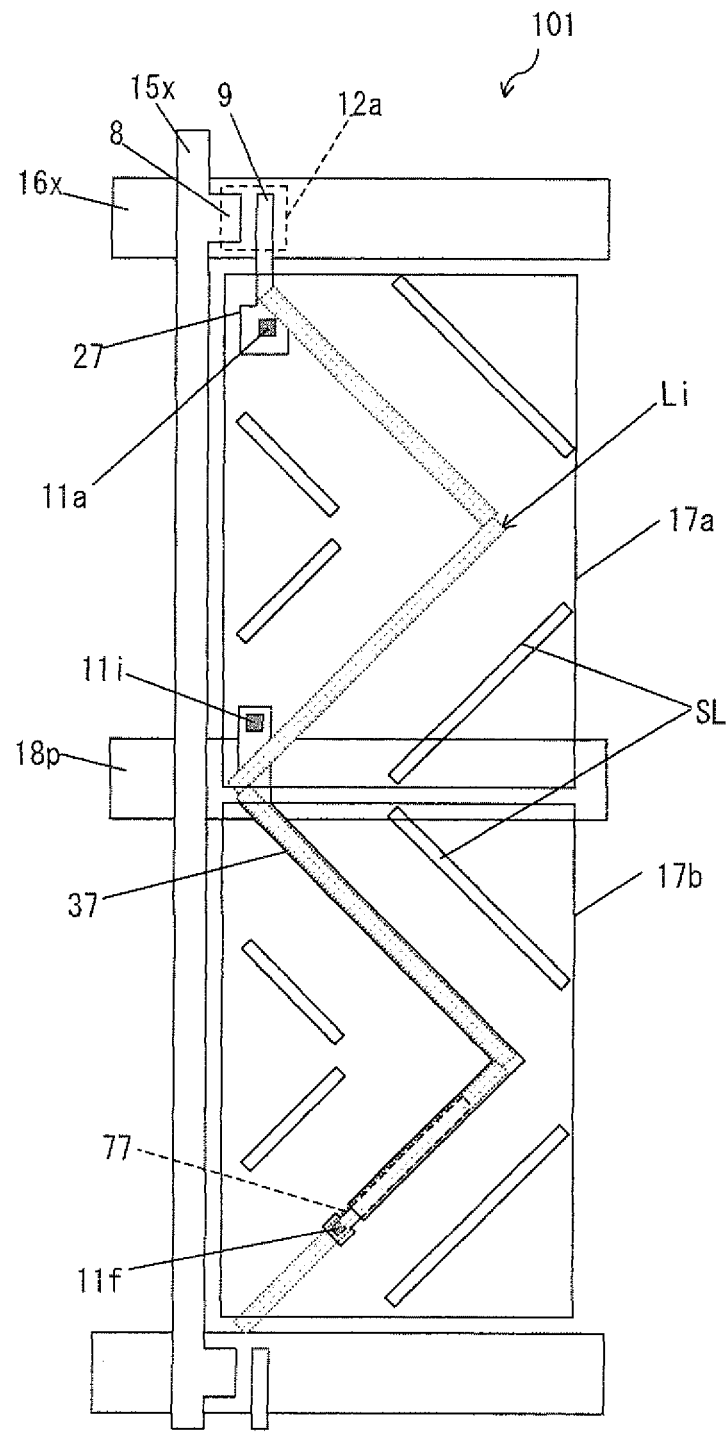
FIG. 15

The liquid crystal panel illustrated in FIG. 8 may be configured as illustrated in FIG. 15. Namely, although illustrations are omitted in FIG. 8, a MVA liquid crystal panel has, as illustrated in FIG. 15, slits SL for alignment controlling provided on the pixel electrodes of the active matrix substrate and ribs (linear projection) Li for alignment controlling provided on the color filter substrate. By providing the upper layer capacitor electrode 37 and the lower layer capacitor electrode 77 of the active matrix substrate below the ribs Li in the embodiment, it is possible to increase the aperture ratio.

Figure 16:
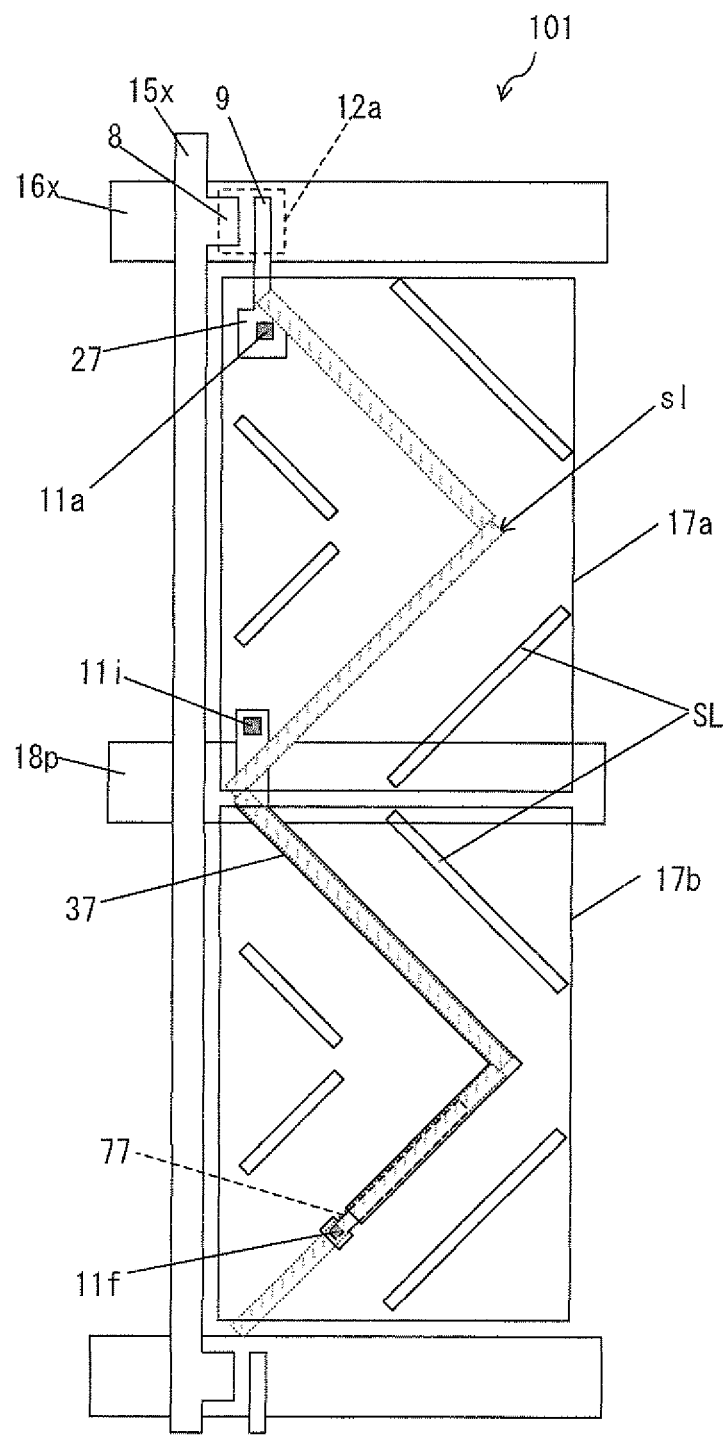
FIG. 16

Moreover, with the MVA liquid crystal panel, there are cases where the pixel electrode of the active matrix substrate is provided with slits SL for alignment controlling and the common electrode (counter electrode) of the color filter substrate is provided with slits sl for alignment controlling, as illustrated in FIG. 16. In this case, the upper layer capacitor electrode 37 and the lower layer capacitor electrode 77 of the active matrix substrate may be disposed below the slits sl of the common electrode, in order to increase the aperture ratio.

Figure 17:
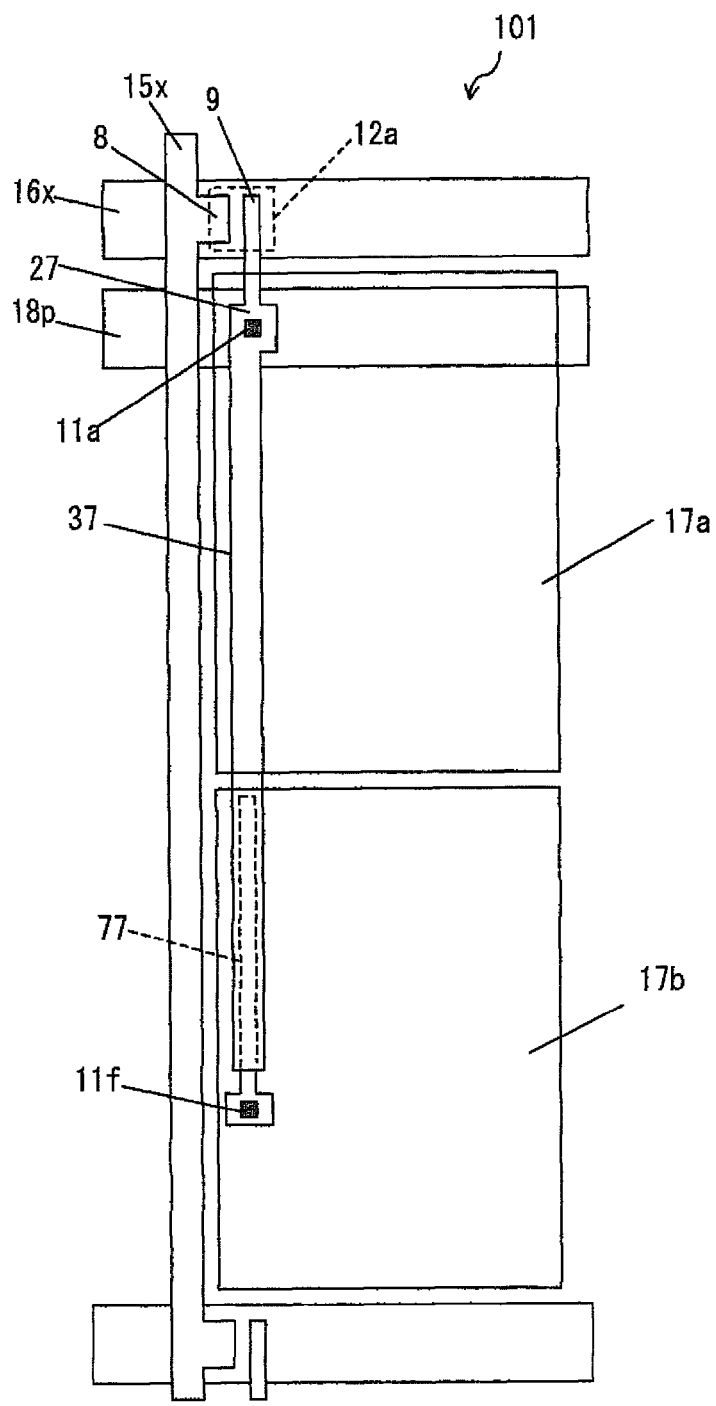
FIG. 17
Figure 18:
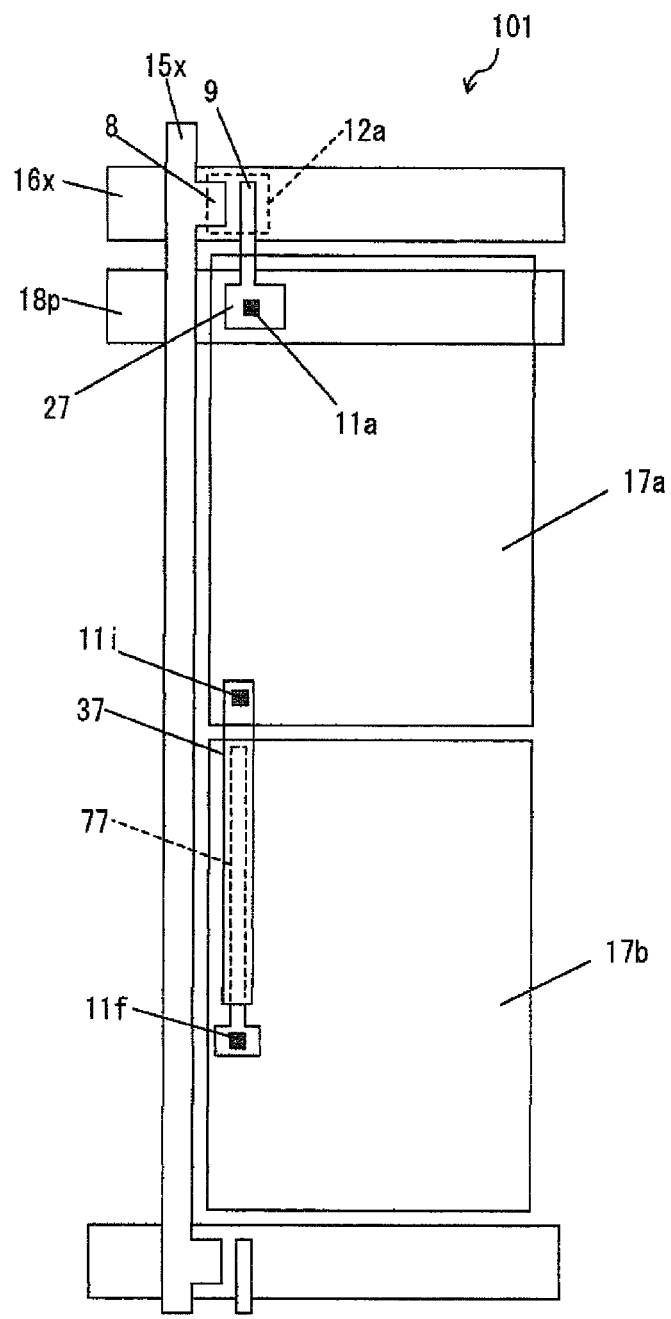
FIG. 18
Figure 19:
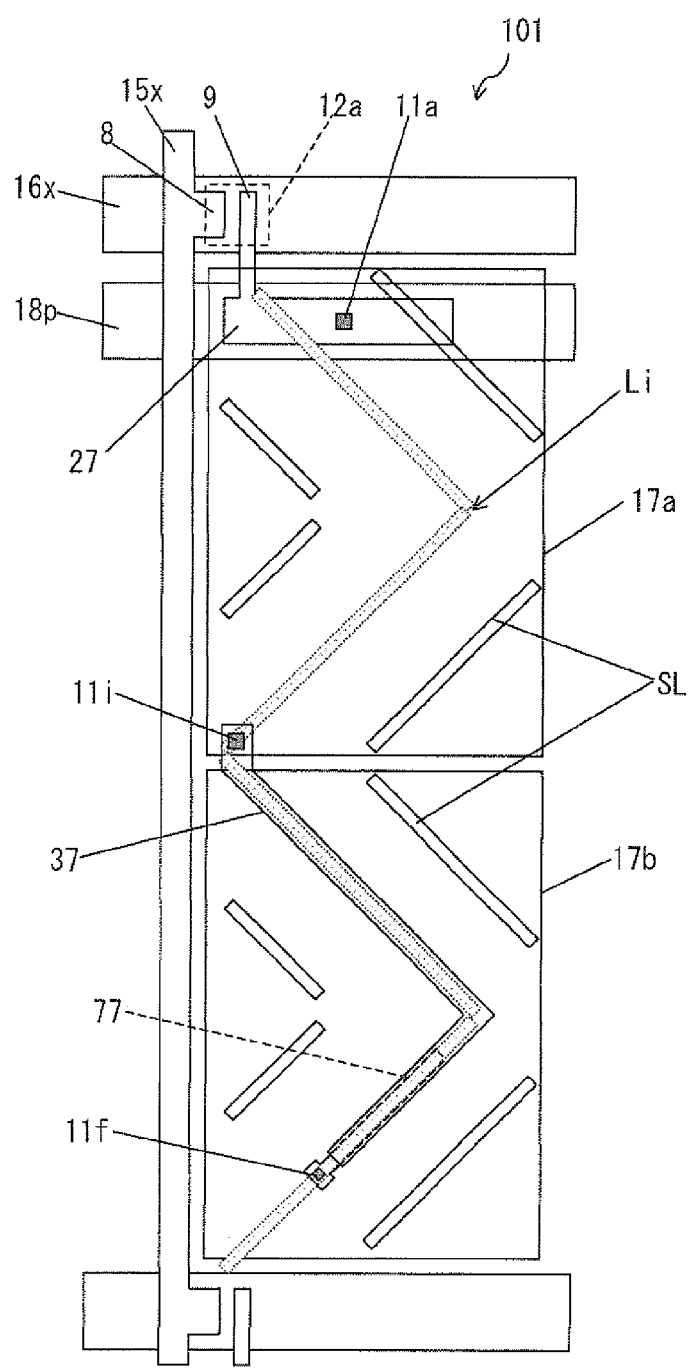
FIG. 19

The liquid crystal panel illustrated in FIG. 1 may be modified as illustrated in FIG. 17. Namely, the storage capacitor wire 18p is disposed close to the scanning signal line 16x. In this case, the storage capacitor wire 18p is overlapped just by the pixel electrode 17a in such a manner that the gate insulating film and the interlayer insulating film is sandwiched between the storage capacitor wire 18p and the pixel electrode 17a, and at this overlapping part, a storage capacitor between the storage capacitor wire 18p and the pixel electrode 17a is formed. In a case where the interlayer insulating film has a certain thickness, the drain draw-out electrode 27 can be extended so that it overlaps the storage capacitor wire 18p, in order to secure the storage capacitance. Similarly, the liquid crystal panel illustrated in FIG. 8 may be modified as illustrated in FIG. 18. Namely, the storage capacitor wire 18p is disposed close to the scanning signal line 16x. In this case, the storage capacitor wire 18p is overlapped by just the pixel electrode 17a in such a manner that the gate insulating film and the inorganic interlayer insulating film are sandwiched between the storage capacitor wire 18p and the pixel electrode 17a, and at this overlapping part, a storage capacitor between the storage capacitor wire 18p and the pixel electrode 17a is formed. Similarly, the liquid crystal panel illustrated in FIG. 15 can be modified as illustrated in FIG. 19. Namely, the storage capacitor wire 18p is disposed close to the scanning signal line 16x. In this configuration, the drain draw-out electrode 27 is extended so as to overlap the storage capacitor wire 18p, in order to secure storage capacitance. In this case, the storage capacitor wire 18p is overlapped by the drain draw-out electrode 27 in such a manner that just the gate insulating film is sandwiched between the storage capacitor wire 18p and the drain draw-out electrode 27, and at this overlapping part, most of storage capacitance between the storage capacitor wire 18p and the pixel electrode 17a is formed.

Figure 20:
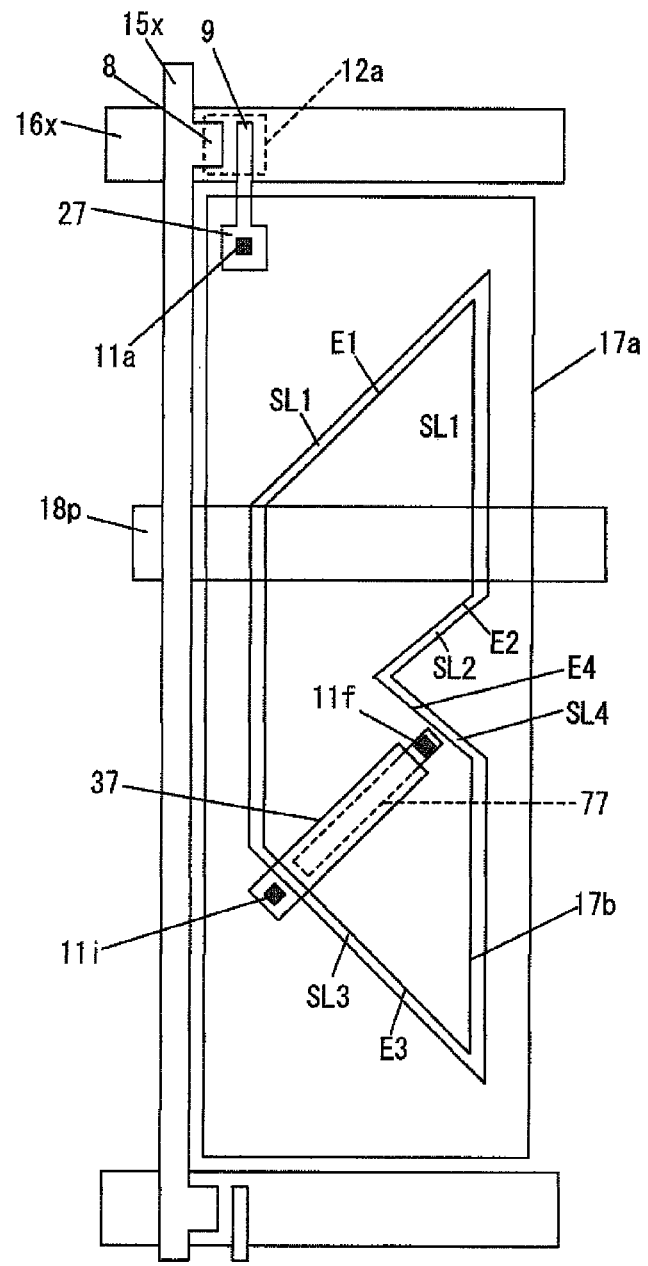
FIG. 20

The liquid crystal panel of FIG. 8 may also be modified as illustrated in FIG. 20. The liquid crystal panel illustrated in FIG. 20 includes a pixel electrode 17b V-shaped when seen along a row direction, and a pixel electrode 17a is disposed so as to surround the pixel electrode 17b. More specifically, the pixel electrode 17b has two edges E1 and E2 each angled at 45 degrees with respect to the row direction, and has two edges E3 and E4 each angled at 315 degrees with respect to the row direction. A gap between the edge E1 and a corresponding edge of the pixel electrode 17a running parallel to the edge E1 serves as a slit SL1 for alignment controlling, a gap between the edge E2 and a corresponding edge of the pixel electrode 17a running parallel to the edge E2 serves as a slit SL2 for alignment controlling, a gap between the edge E3 and a corresponding edge of the pixel electrode 17a running parallel to the edge E3 serves as a slit SL3 for alignment controlling, and a gap between the edge E4 and a corresponding edge of the pixel electrode 17a running parallel to the edge E4 serves as a slit SL4 for alignment controlling.

In the configuration, the drain draw-out electrode 27 is connected to the pixel electrode 17a via the contact hole 11a. The upper layer capacitor electrode 37 connected to the pixel electrode 17a via the contact hole 11i extends in such a manner that the upper layer capacitor electrode 37 extends under the slit SL3. Furthermore, the lower layer capacitor electrode 77 is provided so as to be overlapped by the upper layer capacitor electrode 37 and the pixel electrode 17b, and is connected to the pixel electrode 17b via the contact hole 11f. The upper layer capacitor electrode 37 has two edges disposed below the pixel electrode 17b which are angled at 315 degrees with respect to the row direction, and the lower layer capacitor electrode 77 also has two edges disposed below the pixel electrode 17b which are angled at 315 degrees with respect to the row direction. From a plan view perspective, both the edges of the lower layer capacitor electrode 77 are disposed on inner sides of respective edges of the upper layer capacitor electrode 37. In this configuration, a coupling capacitor Cab1 is formed at a part in which the upper layer capacitor electrode 37 overlaps the lower layer capacitor electrode 77, and a coupling capacitor Cab2 is formed at a part in which the pixel electrode 17b overlaps the upper layer capacitor electrode 37.

The storage capacitor wire 18p is disposed so as to traverse the pixel region. The storage capacitor wire 18p is overlapped by the pixel electrode 17a and the pixel electrode 17b in such a manner that a gate insulating film and an interlayer insulating film are sandwiched between the storage capacitor wire 18p and the pixel electrode 17a or pixel electrode 17b. As a result, a storage capacitor is formed at a part in which the pixel electrode 17a overlaps the storage capacitor wire 18p, and a storage capacitor is formed at a part in which the pixel electrode 17b overlaps the storage capacitor wire 18p.

Figure 21:
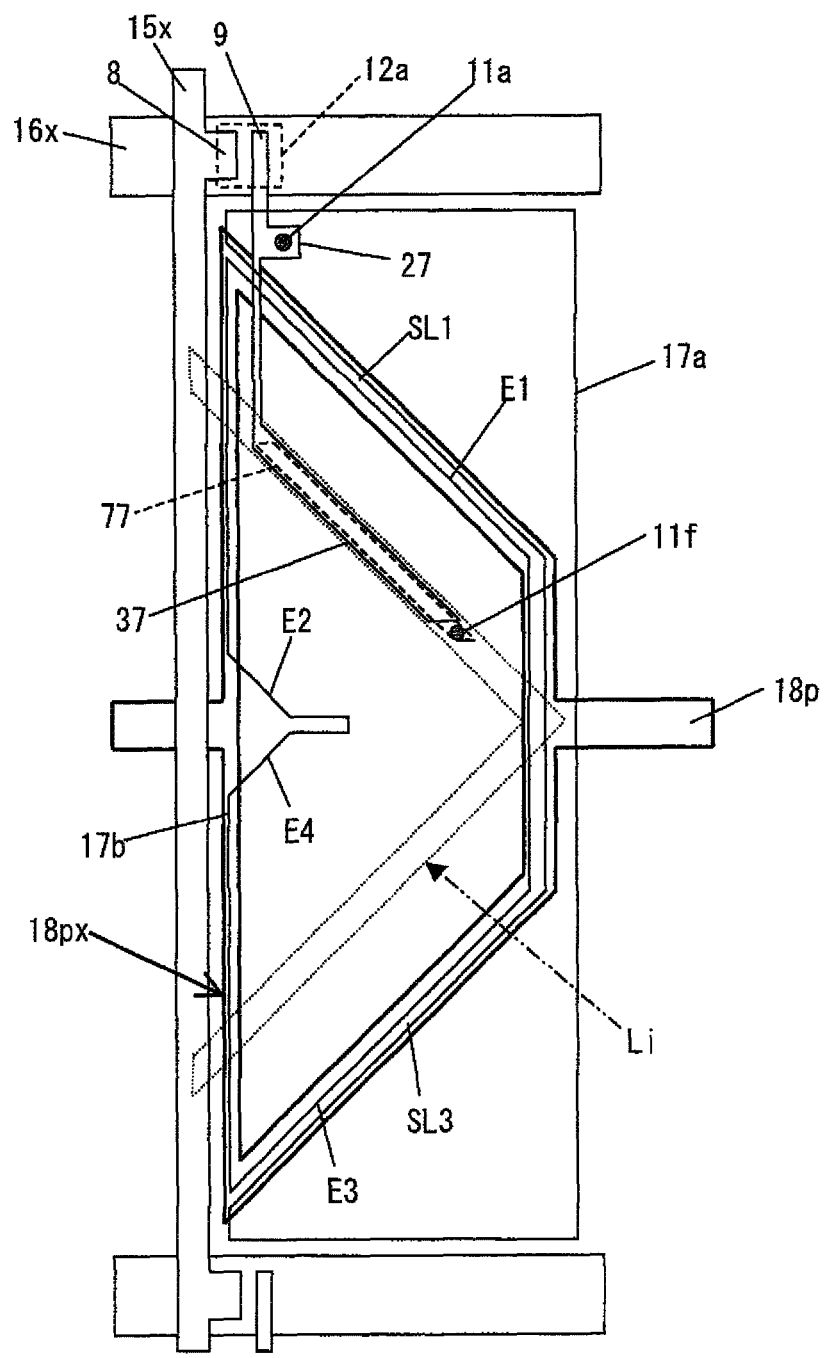
FIG. 21

The liquid crystal panel illustrated in FIG. 20 may also be modified as illustrated in FIG. 21. The liquid crystal panel illustrated in FIG. 21 includes a pixel electrode 17b having two edges E1 and E2 each angled at 315 degrees with respect to the row direction and having two edges E3 and E4 each angled at 45 degrees with respect to the row direction. A gap between the edge E1 and a corresponding edge of the pixel electrode 17a running parallel to the edge E1 serves as a slit SL1 for alignment controlling, and a gap between the edge E3 and a corresponding edge of the pixel electrode 17a running parallel to the edge E3 serves as the slit SL3 for alignment controlling.

The drain draw-out electrode 27 is connected to the upper layer capacitor electrode 37 in the same layer. The upper layer capacitor electrode 37 is extended in the column direction so as to run below the slit SL1, then further changes direction on the pixel electrode 17b by being angled at 315 degrees with respect to the row direction, so as to extend below the rib Li formed on the color filter substrate at a position between the edges E1 and E2 from a plan view perspective.

Moreover, a ring-shaped storage capacitor extension 18px which corresponds to an outer circumference of the pixel electrode 17b extends from the storage capacitor wire 18p. The storage capacitor extension 18px is overlapped by the pixel electrode 17a and pixel electrode 17b in such a manner that the gate insulating film and the interlayer insulating film are sandwiched between the storage capacitor extension 18px and the pixel electrode 17a or pixel electrode 17b. As a result, a storage capacitor is formed at a part in which the pixel electrode 17a overlaps the storage capacitor extension 18px and a storage capacitor is formed at a part in which the pixel electrode 17b overlaps the storage capacitor extension 18px.

As illustrated in FIG. 21, by having the upper layer capacitor electrode 37 run below the rib Li, it is possible to achieve an increase in aperture ratio and improvement in alignment control ability. Needless to say, a slit may be provided on the common electrode of the CF substrate instead of the rib Li. Moreover, by having the storage capacitor extension 18px correspond to the outer circumference of the pixel electrode 17b, it is possible to increase the aperture ratio while maintaining storage capacitance, and further improve alignment control ability. Moreover, it is also possible to attain an effect of holding down image sticking of the pixel electrode 17b which is in an electrically floating state.

Figure 22:
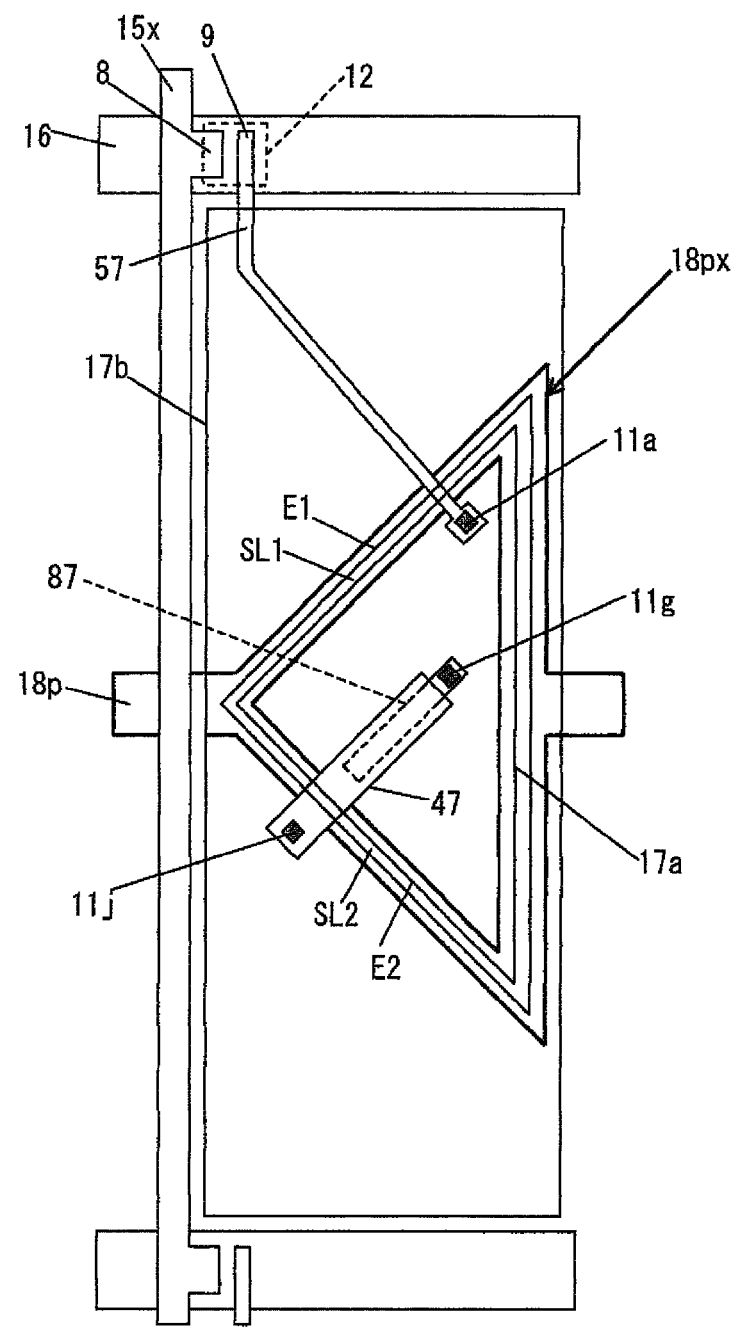
FIG. 22

The liquid crystal panel illustrated in FIG. 9 may be modified as illustrated in FIG. 22. The liquid crystal panel illustrated in FIG. 22 includes a pixel electrode 17a triangular-shaped when seen along the row direction, and a pixel electrode 17b being provided surrounding the pixel electrode 17a. More specifically, the pixel electrode 17a has an edge E1 angled at 45 degrees with respect to the row direction, and has an edge E2 angled at 315 degrees with respect to the row direction. A gap between the edge E1 and a corresponding edge of the pixel electrode 17b running parallel to the edge E1 serves as a slit SL1 for alignment controlling, and a gap between the edge E2 and a corresponding edge of the pixel electrode 17b running parallel to the edge E2 serves as a slit SL2 for alignment controlling.

In the embodiment, a drain draw-out wire 57 drawn out from the drain electrode 9 is connected to the pixel electrode 17a via the contact hole 11a. An upper layer capacitor electrode 47 connected to the pixel electrode 17b via a contact hole 11j is extended so as to run below the slit SL2. Further, a lower layer capacitor electrode 87 is provided in such a manner that the upper layer capacitor electrode 47 and the pixel electrode 17a overlap the lower layer capacitor electrode 87, and the lower layer capacitor electrode 87 is connected to the pixel electrode 17a via a contact hole 11g. Note that the upper layer capacitor electrode 47 has two edges disposed below the pixel electrode 17a, each of which are angled at 45 degrees with respect to the row direction, and the lower layer capacitor electrode 87 also has two edges disposed below the pixel electrode 17a, each of which are angled at 45 degrees with respect to the row direction. From a plan view perspective, both of the edges of the lower layer capacitor electrode 87 are disposed on inner sides of respective edges of the upper layer capacitor electrode 47.

In this configuration, a part in which the lower layer capacitor electrode 87, the upper layer capacitor electrode 47, and the pixel electrode 17a overlap has a gate insulating film sandwiched between the lower layer capacitor electrode 87 and the upper layer capacitor electrode 47, and an interlayer insulating film sandwiched between the upper layer capacitor electrode 47 and the pixel electrode 17a. As a result, a coupling capacitor is formed at a part in which the upper layer capacitor electrode 47 overlaps the lower layer capacitor electrode 87, and a coupling capacitor is formed at a part in which the pixel electrode 17a overlaps the upper layer capacitor electrode 47. These two coupling capacitors are parallelized.

Moreover, a ring-shaped storage capacitor extension 18px extends from the storage capacitor wire 18p, which storage capacitor extension 18px corresponds to an outer circumference of the pixel electrode 17a. The storage capacitor extension 18px is overlapped by the pixel electrode 17a and the pixel electrode 17b in such a manner that the gate insulating film and the interlayer insulating film are sandwiched between the storage capacitor extension 18px and the pixel electrode 17a or pixel electrode 17b. As a result, a storage capacitor is formed at a part in which the pixel electrode 17a overlaps the storage capacitor extension 18px, and a storage capacitor is formed at a part in which the pixel electrode 17b overlaps the storage capacitor extension 18px. As illustrated in FIG. 22, by having the storage capacitor extension 18px correspond to the outer circumference of the pixel electrode 17a, it is possible to increase the aperture ratio while securing the storage capacitance, and further improve the alignment control ability.

Figure 23:
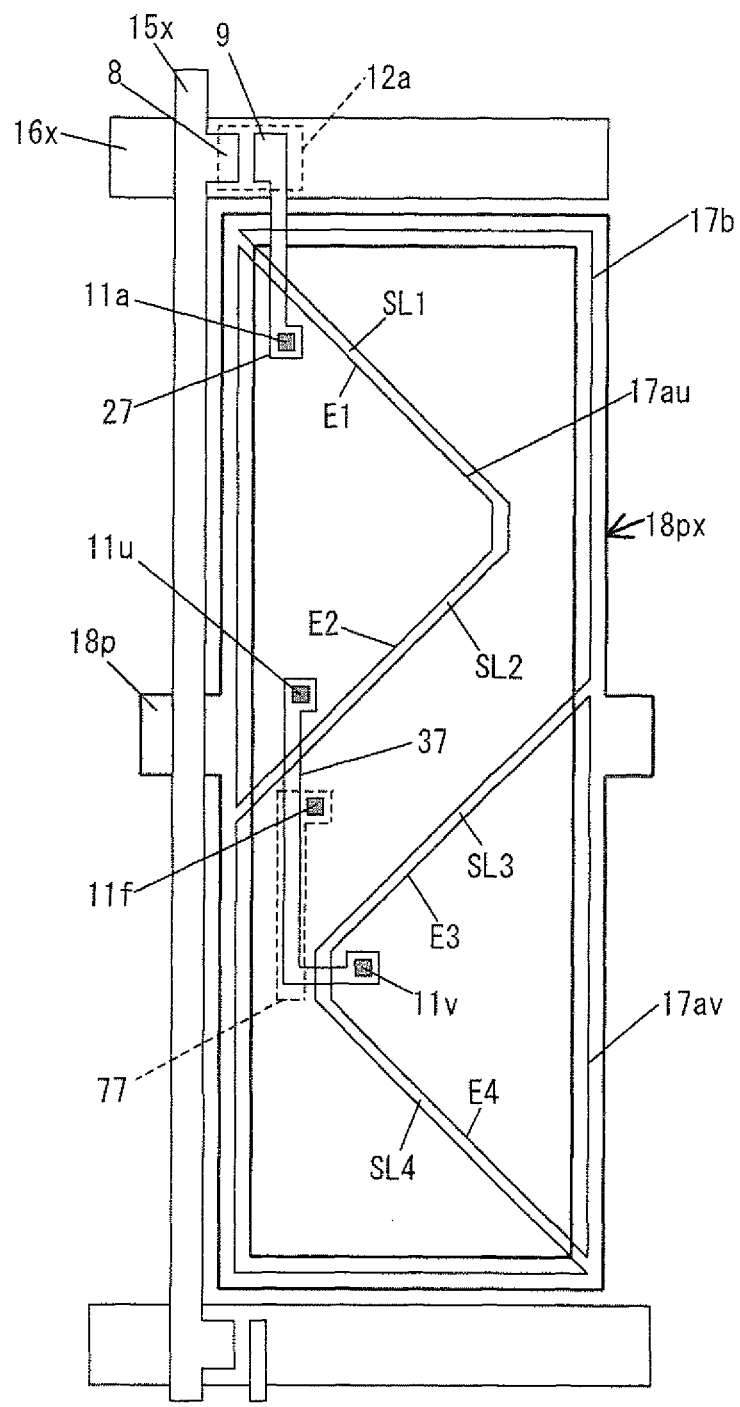
FIG. 23

The present liquid crystal panel may also be configured as illustrated in FIG. 23. The liquid crystal panel of FIG. 23 has a transistor 12a disposed in the vicinity of an intersection of a data signal line 15x and a scanning signal line 16x; a source electrode 8 of the transistor 12a is connected to the data signal line 15x, the scanning signal line 16x serves also as a gate electrode of the transistor 12a, and a drain electrode 9 of the transistor 12a is connected to a drain draw-out electrode 27. A pixel region partitioned by the two signal lines (15x and 16x) includes a pixel electrode 17au disposed close to the transistor 12a, a pixel electrode 17b, and a pixel electrode 17av being identical in shape with the pixel electrode 17au. The pixel electrode 17au is shaped of an isosceles trapezoid having an edge E1 and an edge E2 serve as sides of equal lengths, which edge E1 is angled at 315 degrees with respect to the row direction and which edge E2 is angled at 45 degrees with respect to the row direction, and the isosceles trapezoid having its base side running along the column direction. The pixel electrode 17av is shaped of an isosceles trapezoid having an edge E3 and an edge E4 serve as the sides of equal lengths, which edge E3 is angled at 45 degrees with respect to the row direction and which edge E4 is angled at 315 degrees with respect to the row direction, and the isosceles trapezoid having its base side running along the column direction. The pixel electrodes 17au and 17av are disposed in such a manner that, when the pixel electrode 17au is rotated by 180 degrees having a center of the pixel region serve as a central point of rotation, the pixel electrode 17au matches in position with the pixel electrode 17av. The pixel electrode 17b is of a Z-shape which fits with the pixel electrodes 17au and 17av. Furthermore, a gap between the edge E1 of the pixel electrode 17au and a corresponding edge of the pixel electrode 17b running parallel to the edge E1 serves as a slit SL1 for alignment controlling, a gap between the edge E2 of the pixel electrode 17au and a corresponding edge of the pixel electrode 17b running parallel to the edge E2 serves as a slit SL2 for alignment controlling, a gap between the edge E3 of the pixel electrode 17av and a corresponding edge of the pixel electrode 17b running parallel to the edge E3 serves as a slit SL3 for alignment controlling, and a gap between the edge E4 of the pixel electrode 17av and a corresponding edge of the pixel electrode 17b running parallel to the edge E4 serves as a slit SL4 for alignment controlling.

In the embodiment, the drain draw-out electrode 27 is connected to the pixel electrode 17au via a contact hole 11a. An upper layer capacitor electrode 37 connected to the pixel electrode 17au via a contact hole 11u extends in the column direction and runs below the slit SL2. The upper layer capacitor electrode 37 then changes its direction by 90 degrees at a position below the pixel electrode 17b, to extend below the pixel electrode 17av, and an end section of the upper layer capacitor electrode 37 and the pixel electrode 17av are connected via a contact hole 11v. Furthermore, a lower layer capacitor electrode 77 is provided in such a manner that the lower layer capacitor electrode 77 is overlapped by the upper layer capacitor electrode 37 and the pixel electrode 17b, and the lower layer capacitor electrode 77 is connected to the pixel electrode 17b via a contact hole 11f. The upper layer capacitor electrode 37 has two edges disposed below the pixel electrode 17b, which edges run along the column direction, and the lower layer capacitor electrode 77 also has two edges disposed below the pixel electrode 17b, which edges run along the column direction. From a plan view perspective, both of the edges of the lower layer capacitor electrode 37 are disposed on inner sides of respective edges of the upper layer capacitor electrode 77. In this configuration, a coupling capacitor is formed at a part in which the upper layer capacitor electrode 37 overlaps the lower layer capacitor electrode 77, and a coupling capacitor is formed at a part in which the pixel electrode 17b overlaps the upper layer capacitor electrode 37. These two coupling capacitors are parallelized.

Moreover, a ring-shaped storage capacitor extension 18px corresponding to an outer circumference of the pixel region extends from the storage capacitor wire 18p. The storage capacitor extension 18px is overlapped by the pixel electrode 17a and the pixel electrode 17b in such a manner that the gate insulating film and the interlayer insulating film are sandwiched between the storage capacitor extension 18px and the pixel electrode 17a or pixel electrode 17b. As a result, a storage capacitor is formed at a part in which the pixel electrode 17a overlaps the storage capacitor extension 18px, and a storage capacitor is formed at a part in which the pixel electrode 17b overlaps the storage capacitor extension 18px. As illustrated in FIG. 23, by having the storage capacitor extension 18px correspond to the outer circumference of the pixel region, it is possible to hold down image sticking of the pixel electrode 17b while securing the storage capacitance, which pixel electrode 17b is in an electrically floating state.

Figure 24:
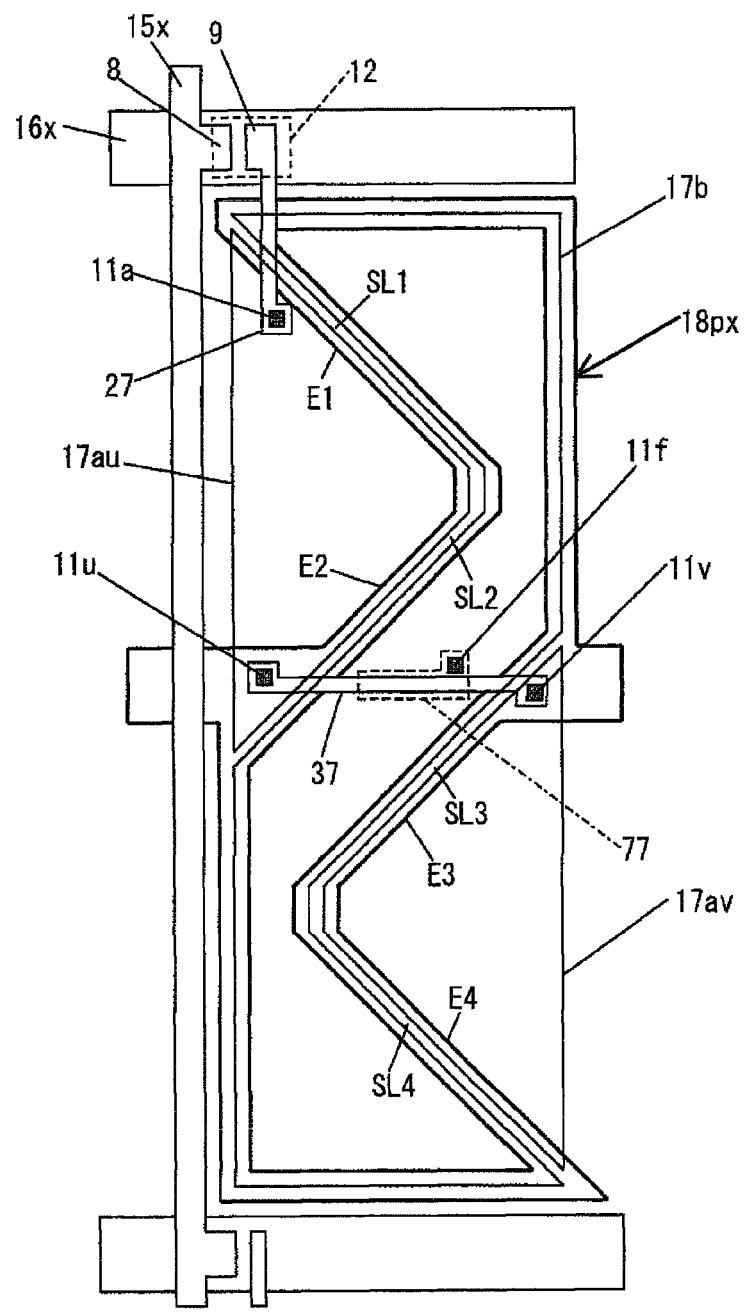
FIG. 24

The liquid crystal panel illustrated in FIG. 23 may also be modified as illustrated in FIG. 24. Namely, the storage capacitor extension 18px is disposed so as to correspond to an outer circumference of the pixel electrode 17b, and the upper layer capacitor electrode 37 is extended in the row direction. In FIG. 24, the upper layer capacitor electrode 37 connected to the pixel electrode 17au via the contact hole 11u is extended in the row direction midway of the pixel in the column direction, first extends below the slit SL2 to reach below the pixel electrode 17b, then further extends below the slit SL3 to reach below the pixel electrode 17av; and the upper layer capacitor electrode 37 has its end section be connected to the pixel electrode 17av via the contact hole 11v. As illustrated in FIG. 24, by having the storage capacitor extension 18px correspond to the outer circumference of the pixel electrode 17b, it is possible to increase the aperture ratio while securing the storage capacitance, and further improve the alignment control ability. Moreover, it is possible to attain an effect of holding down the image sticking of the pixel electrode 17b which is in an electrically floating state.

Figure 25:
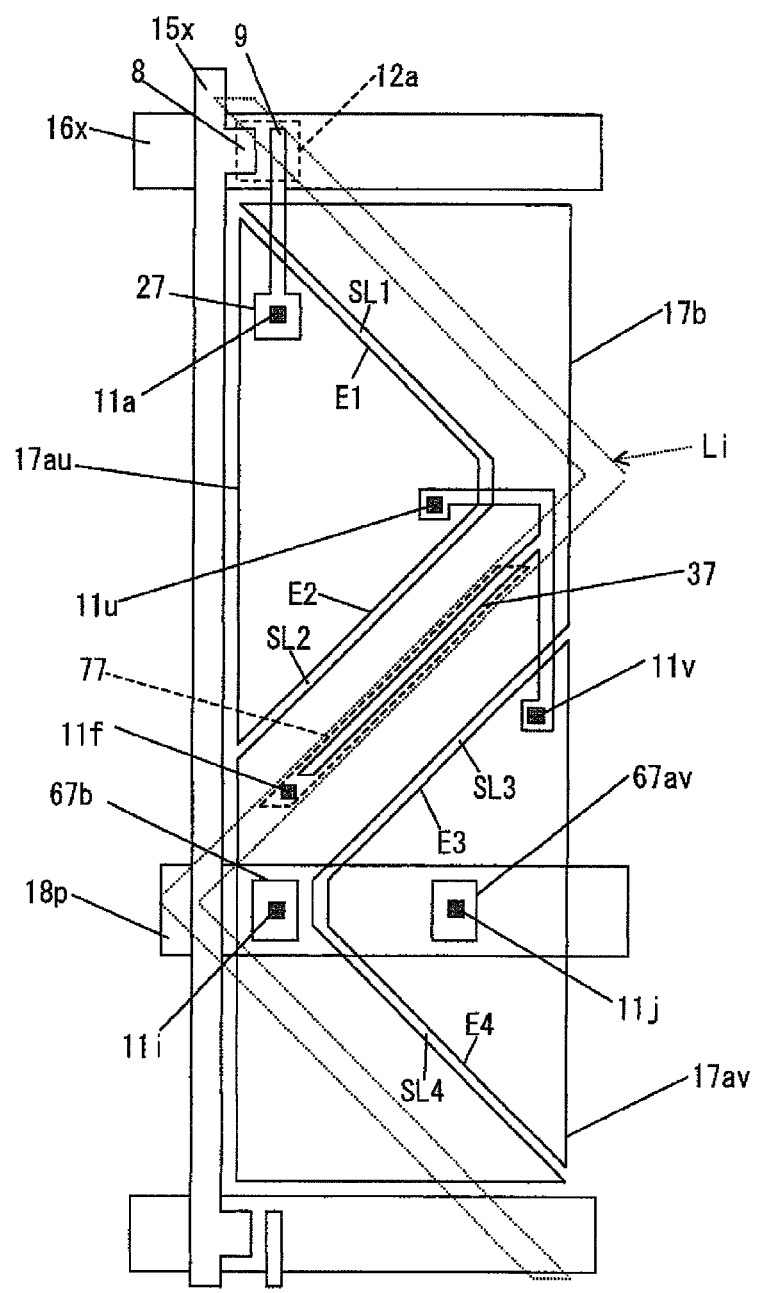
FIG. 25

The liquid crystal panel illustrated in FIG. 23 may also be modified as illustrated in FIG. 25. In FIG. 25, the upper layer capacitor electrode 37 connected to the pixel electrode 17au via the contact hole 11u is extended in the row direction, and then branches out into two directions below the pixel electrode 17b. One of the branches extends below and along the rib Li formed on the color filter substrate, in such a manner that the upper layer capacitor electrode 37 extends by being angled at 315 degrees with respect to the row direction, between the edges E2 and E3 of the pixel electrode 17b from a plan view perspective. The other branch extends below the slit SL3 and reaches below the pixel electrode 17av, and an end section of this other branch of the upper layer capacitor electrode 37 is connected to the pixel electrode 17av via the contact hole 11v.

Moreover, the storage capacitor wire 18p is disposed so as to traverse the pixel region. A storage capacitor electrode 67b is provided overlapping the storage capacitor wire 18p and being overlapped by the pixel electrode 17b, and a storage capacitor electrode 67av is provided overlapping the storage capacitor wire 18p and being overlapped by the pixel electrode 17av. The storage capacitor electrodes 67b and 67av are both formed in a same layer as the data signal line 15x. The pixel electrode 17b is connected to the storage capacitor electrode 67b via a contact hole 11i, and the pixel electrode 17av is connected to the storage capacitor electrode 67av via a contact hole 11j.

As illustrated in FIG. 25, by having the upper layer capacitor electrode 37 be provided running below the rib Li, it is possible to attain an increase in aperture ratio and improvement in alignment control ability. Needless to say, instead of the rib Li, a slit may be provided on the common electrode of the CF substrate. Moreover, by providing the storage capacitor electrodes 67b and 67av, it is possible to increase the storage capacitance between the storage capacitor wire 18p and the pixel electrode 17au or pixel electrode 17av and increase the storage capacitance between the storage capacitor wire 18p and the pixel electrode 17b.

The pixels included in the liquid crystal panel illustrated in FIG. 2 have identical configurations, however the present invention is not limited to this. For example, as illustrated in FIG. 26, the connection relationship of the pixel electrode with the transistor may be varied between pixels that are adjacent in the row direction.

For example, in pixel 101, the pixel electrode 17a is connected to the data signal line 15x via the transistor 12a which is connected to the scanning signal line 16x, and the pixel electrode 17a is connected to the pixel electrode 17b via the coupling capacitors Cab1 and Cab2. The storage capacitor Cha is formed between the pixel electrode 17a and the storage capacitor wire 18p, and the storage capacitor Chb is formed between the pixel electrode 17b and the storage capacitor wire 18p. Further, the liquid crystal capacitor Cla is formed between the pixel electrode 17a and the common electrode com, and the liquid crystal capacitor Clb is formed between the pixel electrode 17b and the common electrode corn. Note that the coupling capacitors Cab1 and Cab2 are in parallel.

On the other hand, in the pixel 103 which is adjacent to the pixel 101 in the row direction, the pixel electrode 17B adjacent to the pixel electrode 17b in the row direction is connected to the data signal line 15y via the transistor 12A which is connected to the scanning signal line 16x, and the pixel electrode 17A adjacent to the pixel electrode 17a in the row direction is connected to the pixel electrode 17B via the coupling capacitors CAB1 and CAB2. Further, the storage capacitor ChA is formed between the pixel electrode 17A and the storage capacitor wire 18p, and the storage capacitor ChB is formed between the pixel electrode 17B and the storage capacitor wire 18p. Moreover, the liquid crystal capacitor ClA is formed between the pixel electrode 17A and the common electrode corn, and the liquid crystal capacitor ClB is formed between the pixel electrode 17B and the common electrode corn. Note that the coupling capacitors CAB1 and CAB2 are in parallel.

Figure 26:
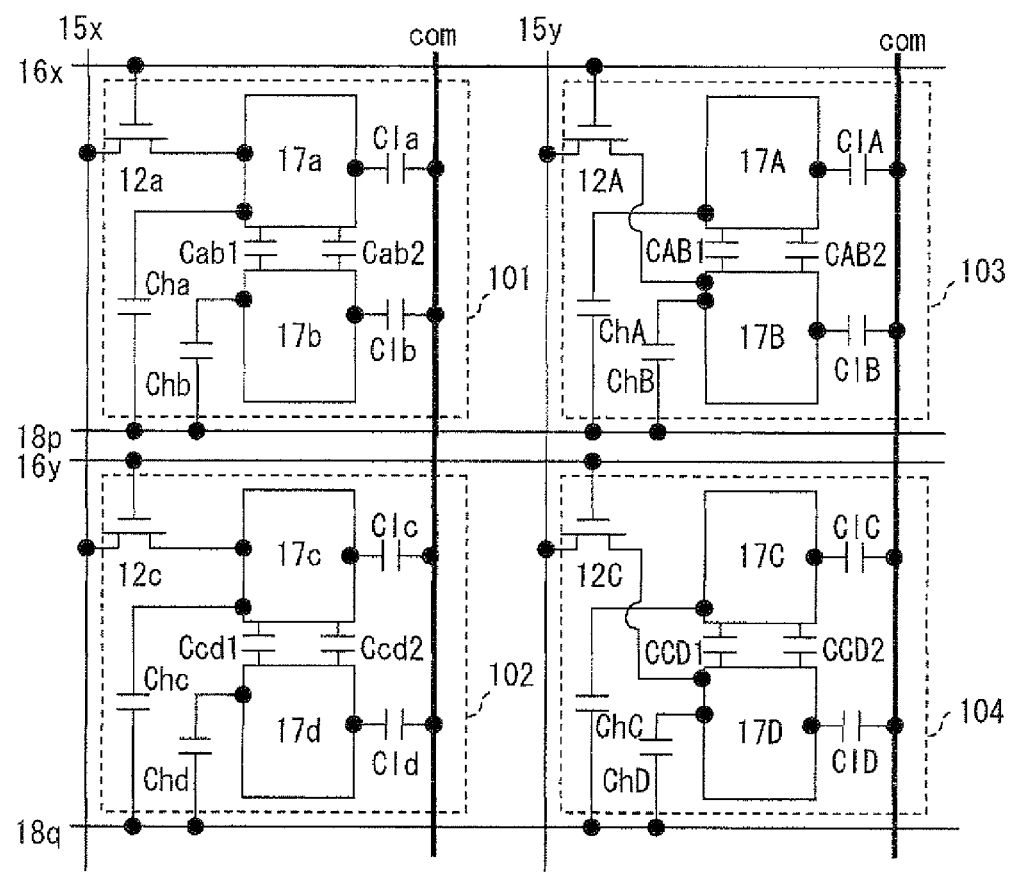
FIG. 26
Figure 27:
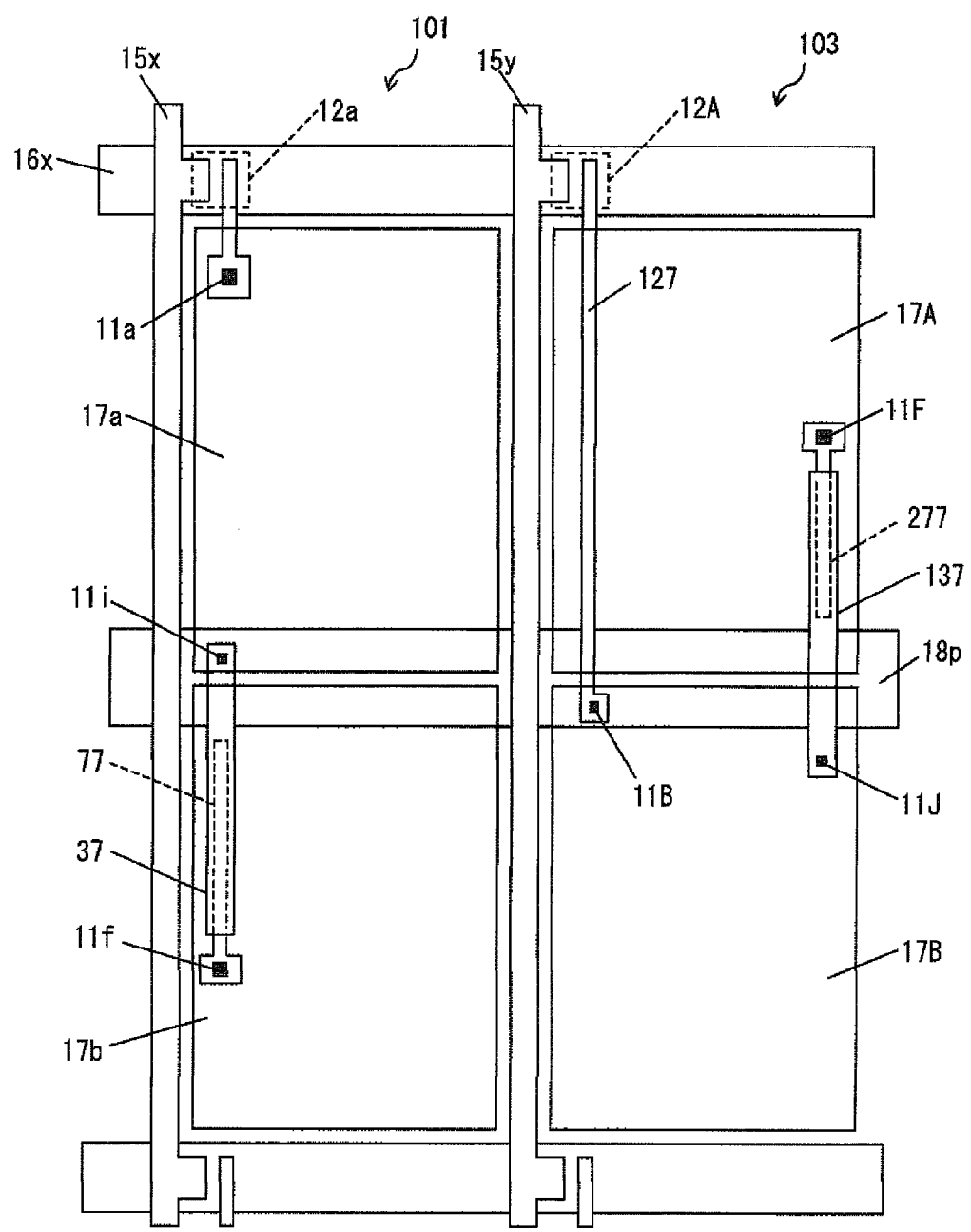
FIG. 27

A specific example of the pixels 101 and 103 illustrated in FIG. 26 is illustrated in FIG. 27. The arrangement of the pixel 101 is identical to that of FIG. 8. On the other hand, in the pixel 103, the transistor 12A is disposed in the vicinity of the intersection of the data signal line 15y and the scanning signal line 16x; the source electrode of the transistor 12A is connected to the data signal line 15y, the scanning signal line 16x serves also as the gate electrode of the transistor 12A, and the drain electrode of the transistor 12A is connected to the drain draw-out electrode 127. A pixel region partitioned by the two signal lines (15y and 16x) includes a pixel electrode 17A disposed close to the transistor 12A and a pixel electrode 17B, which are aligned in the column direction.

A drain draw-out electrode 127 is connected to the pixel electrode 17B via a contact hole 11B, and an upper layer capacitor electrode 137 connected to the pixel electrode 17B via a contact hole 11J extends in such a manner that the pixel electrode 17A overlaps the upper layer capacitor electrode 137. Furthermore, a lower layer capacitor electrode 277 is provided so as to be overlapped by the upper layer capacitor electrode 137 and the pixel electrode 17A, and the lower layer capacitor electrode 277 is connected to the pixel electrode 17A via a contact hole 11F. The upper layer capacitor electrode 137 has two edges disposed below the pixel electrode 17A, which edges run along the column direction, and the lower layer capacitor electrode 277 also has two edges disposed below the pixel electrode 17A, which edges run along the column direction. From a plan view perspective, both the edges of the lower layer capacitor electrode 277 are disposed on inner sides of respective edges of the upper layer capacitor electrode 137.

In the embodiment, the lower layer capacitor electrode 277 is formed in a same layer as the scanning signal line 16x, and the upper layer capacitor electrode 137 is formed in a same layer as the data signal line 15y. At a part in which the lower layer capacitor electrode 277, the upper layer capacitor electrode 137, and the pixel electrode 17A overlap, a gate insulating film is sandwiched between the lower layer capacitor electrode 277 and the upper layer capacitor electrode 137, and an interlayer insulating film is sandwiched between the upper layer capacitor electrode 137 and the pixel electrode 17A. As a result, the coupling capacitor CAB1 is formed at a part in which the upper layer capacitor electrode 137 overlaps the lower layer capacitor electrode 277, and the coupling capacitor CAB2 is formed at a part in which the pixel electrode 17A overlaps the upper layer capacitor electrode 137.

Moreover, the storage capacitor wire 18p is overlapped by the pixel electrode 17A and the pixel electrode 17B in such a manner that the gate insulating film and the interlayer insulating film are sandwiched between the storage capacitor wire 18p and the pixel electrode 17A or pixel electrode 17B. As a result, the storage capacitor ChA is formed at a part in which the pixel electrode 17A overlaps the storage capacitor wire 18$p$, and the storage capacitor ChB is formed at a part in which the pixel electrode 17B overlaps the storage capacitor wire 18$p$.

Figure 28:
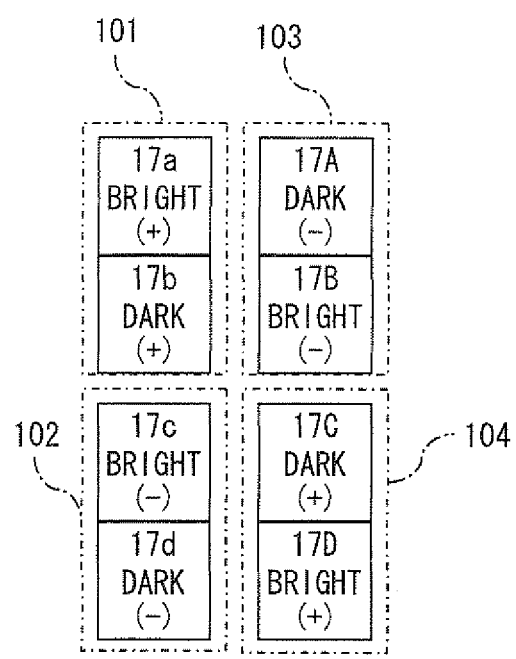
FIG. 28

As illustrated in FIG. 28, during halftone display of a liquid crystal panel including the liquid crystal panel illustrated in FIGS. 26 and 27, a sub-pixel including the pixel electrode 17$a$ is a bright sub-pixel, a sub-pixel including the pixel electrode 17$b$ is a dark sub-pixel, a sub-pixel including the pixel electrode 17A is a dark sub-pixel, and a sub-pixel including the pixel electrode 17B is a bright sub-pixel. In the present liquid crystal panel, no two bright sub-pixels (dark sub-pixels) become adjacent to each other in the row direction. Hence, a high quality display having few striped unevenness is attainable as compared to a configuration in which bright sub-pixels (or dark sub-pixels) are aligned in the row direction.

Figure 34:
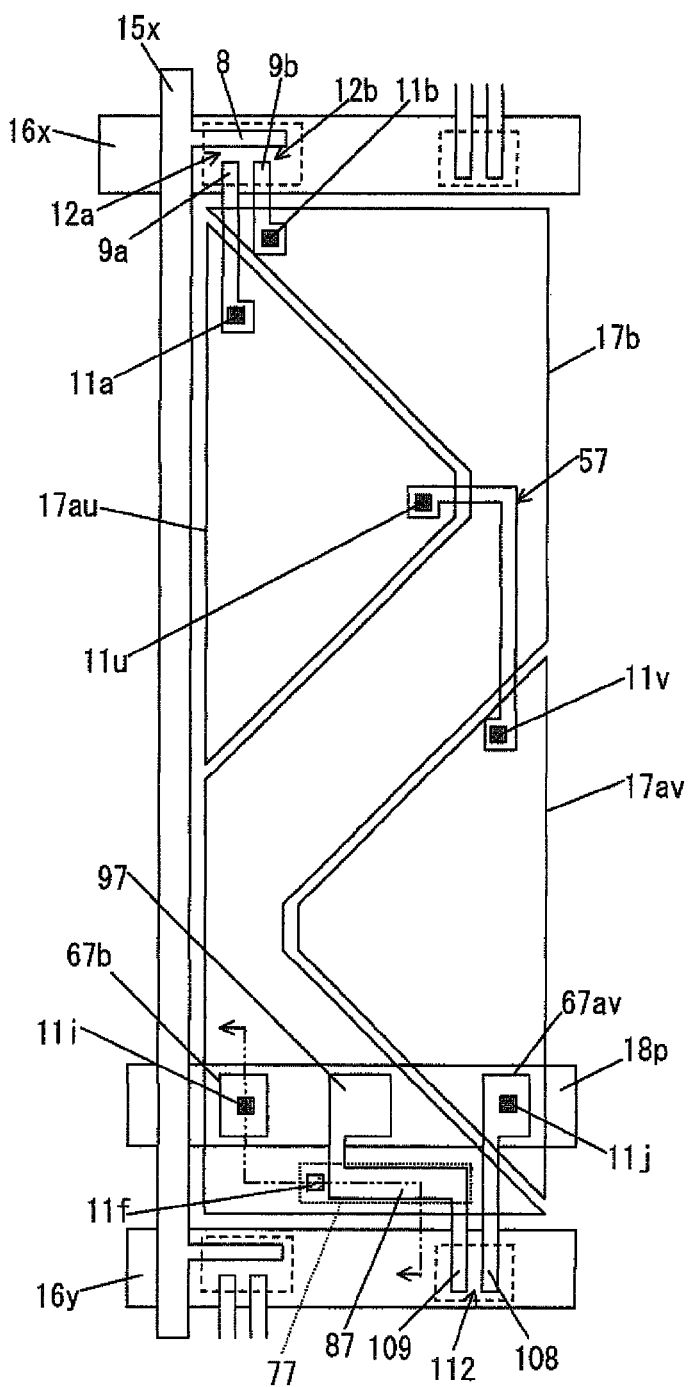
FIG. 34
Figure 35:
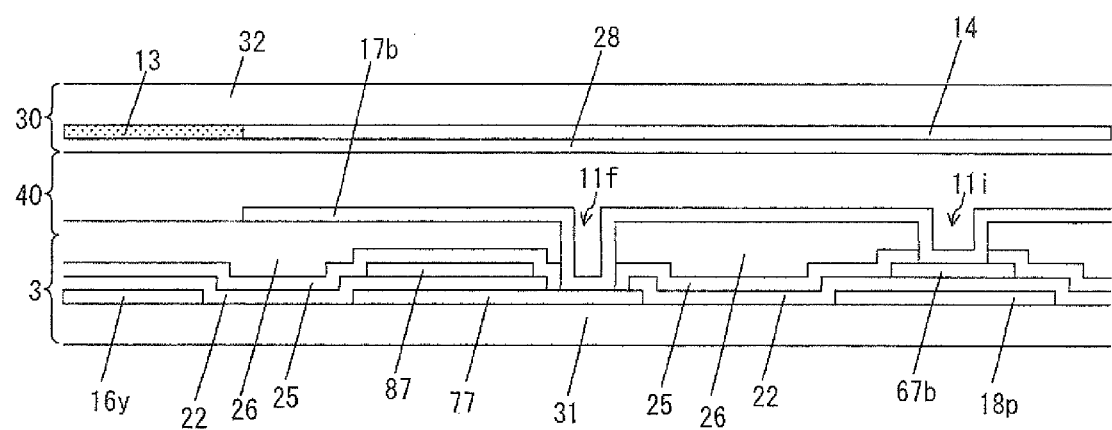
FIG. 35
Figure 36:
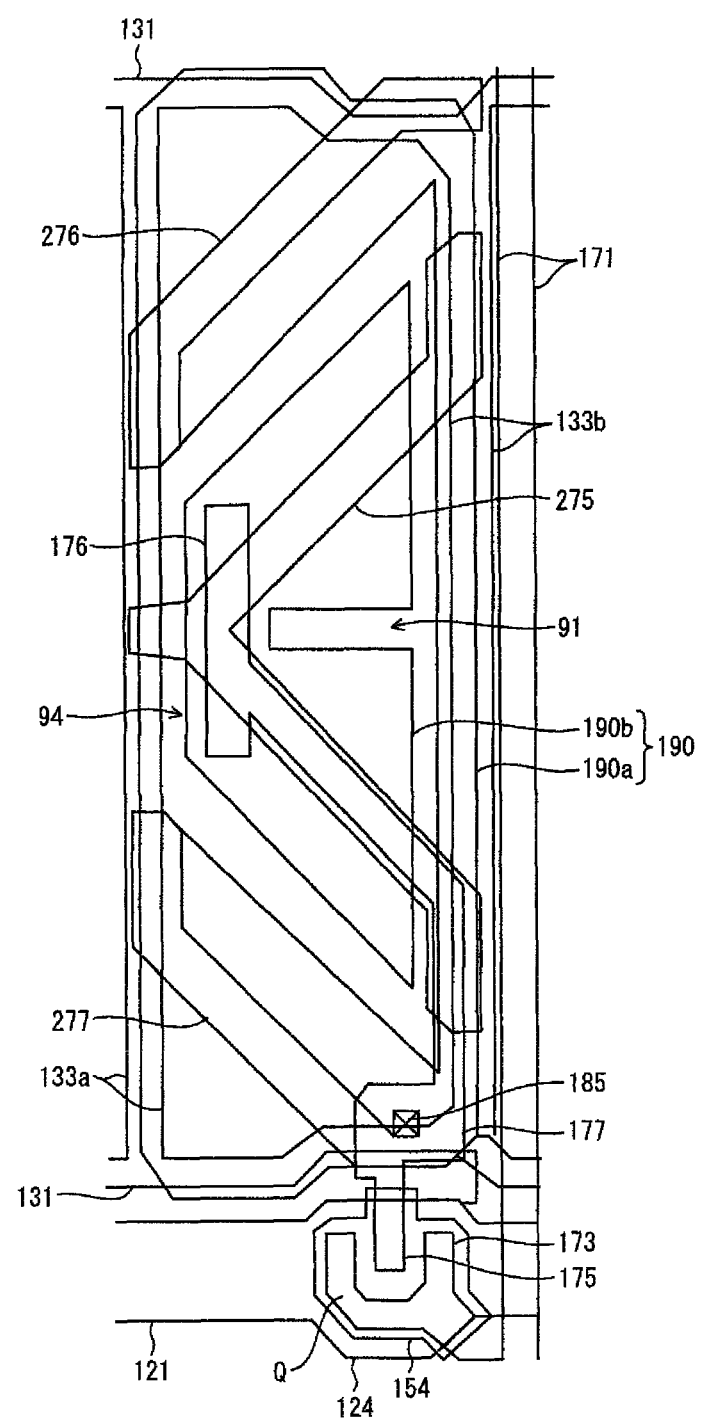
FIG. 36

Another configuration of the present liquid crystal panel is illustrated in FIG. 34, and FIG. 35 illustrates a cross-sectional view of FIG. 34. As illustrated in FIG. 34, an active matrix substrate of the liquid crystal panel includes transistors 12$a$ and 12$b$ connected to a scanning signal line 16$x$, and a transistor 112 connected to a scanning signal line 16$y$ which serves as a next stage of the scanning signal line 16$x$. A pixel region partitioned by the data signal line 15$x$ and the scanning signal line 16$x$ includes: pixel electrodes 17$au$, 17$av$, and 17$b$; storage capacitor electrodes 67$b$ and 67$av$, upper layer capacitor electrodes 87 and 97, and a connecting wire 57, which storage capacitor electrodes, upper layer capacitor electrodes and connecting wire are formed in a same layer as that of the data signal line 15$x$; and a lower layer capacitor electrode 77 formed in a same layer as the scanning signal line 16$x$. Shapes and disposition of the pixel electrodes 17$au$, 17$av$ and 17$b$ are identical to those of FIG. 25. Moreover, the pixel electrode 17$au$ is connected to the pixel electrode 17$av$ via the contact holes 11$u$ and 11$v$ and the connecting wire 57. The storage capacitor electrode 67$b$ is connected to the pixel electrode 17$b$ via a contact hole 11$i$, the storage capacitor electrode 67$av$ is connected to the pixel electrode 17$av$ via a contact hole 11$j$, and the lower layer capacitor electrode 77 is connected to the pixel electrode 17$b$ via a contact hole 11$f$.

Note that a common source electrode 8 of the transistors 12$a$ and 12$b$ is connected to the data signal line 15$x$, a drain electrode 9$a$ of the transistor 12$a$ is connected to the pixel electrode 17$au$ via a contact hole 11$a$, and a drain electrode 9$b$ of the transistor 12$b$ is connected to the pixel electrode 17$b$ via a contact hole 11$b$. Moreover, a source electrode 108 of the transistor 112 is connected to the storage capacitor electrode 67$av$ (is connected in a same layer), a drain electrode 109 of the transistor 112 is connected to the upper layer capacitor electrode 87 (is connected in a same layer), and the upper layer capacitor electrode 87 is connected to the upper layer capacitor electrode 97 (is connected in a same layer).

In the embodiment, as illustrated in FIGS. 34 and 35, the storage capacitor electrode 67$b$ overlaps the storage capacitor wire 18$p$ in such a manner that the gate insulating film 22 is sandwiched between the storage capacitor electrode 67$b$ and the storage capacitor wire 18$p$, and the storage capacitor electrode 67$av$ overlaps the storage capacitor wire 18$p$ in such a manner that the gate insulating film 22 is sandwiched between the storage capacitor electrode 67$av$ and the storage capacitor wire 18$p$. The upper layer capacitor electrode 97 overlaps the storage capacitor wire 18$p$ in such a manner that the gate insulating film 22 is sandwiched between the upper layer capacitor electrode 97 and the storage capacitor wire 18$p$, and further the upper layer capacitor electrode 97 is overlapped by the pixel electrode 17$b$ in such a manner that a channel protective film (a laminated film of the inorganic interlayer insulating film 25 and an organic interlayer insulating film 26 thicker than the inorganic interlayer insulating film) is sandwiched between the upper layer capacitor electrode 97 and the pixel electrode 17$b$. The upper layer capacitor electrode 87 is overlapped by the pixel electrode 17$b$ in such a manner that the channel protective film (the laminated film of the inorganic interlayer insulating film 25 and the organic interlayer insulating film 26 thicker than the inorganic interlayer insulating film 25) is sandwiched between the upper capacitor electrode 87 and the pixel electrode 17$b$, and the lower layer capacitor electrode 77 is overlapped by the upper layer capacitor electrode 87 in such a manner that the gate insulating film 22 is sandwiched between the lower layer capacitor electrode 77 and the upper layer capacitor electrode 87. In the embodiment, a storage capacitor between the pixel electrode 17$av$ and the storage capacitor wire 18$p$ is formed at a part in which the storage capacitor electrode 67$av$ overlaps the storage capacitor wire 18$p$, and a storage capacitor between the pixel electrode 17$b$ and the storage capacitor wire 18$p$ is formed at a part in which the storage capacitor electrode 67$b$ overlaps the storage capacitor wire 18$p$. Most of coupling capacitance between the pixel electrode 17$b$ and the pixel electrodes 17$au$ and 17$av$ is formed at a part in which the upper layer capacitor electrode 87 overlaps the lower layer capacitor electrode 77, and remaining portions of the coupling capacitance are formed at a part in which the pixel electrode 17$b$ overlaps the upper layer capacitor electrode 87 and at a part in which the pixel electrode 17$b$ overlaps the upper layer capacitor electrode 97.

When the liquid crystal panel of FIG. 34 is driven, a single data signal electric potential is written into each of the pixel electrodes 17$au$, 17$av$, and 17$b$ at a time when the scanning signal line 16$x$ is scanned. When the scanning signal line 16$y$ (of the next stage) is scanned, the pixel electrodes 17$av$ and 17$au$ are connected to the pixel electrode 17$b$ via the coupling capacitor. Hence, during halftone display, a dark sub-pixel by the pixel electrodes 17$au$ and 17$av$ and a bright sub-pixel by the pixel electrode 17$b$ are formed.

Figure 29:
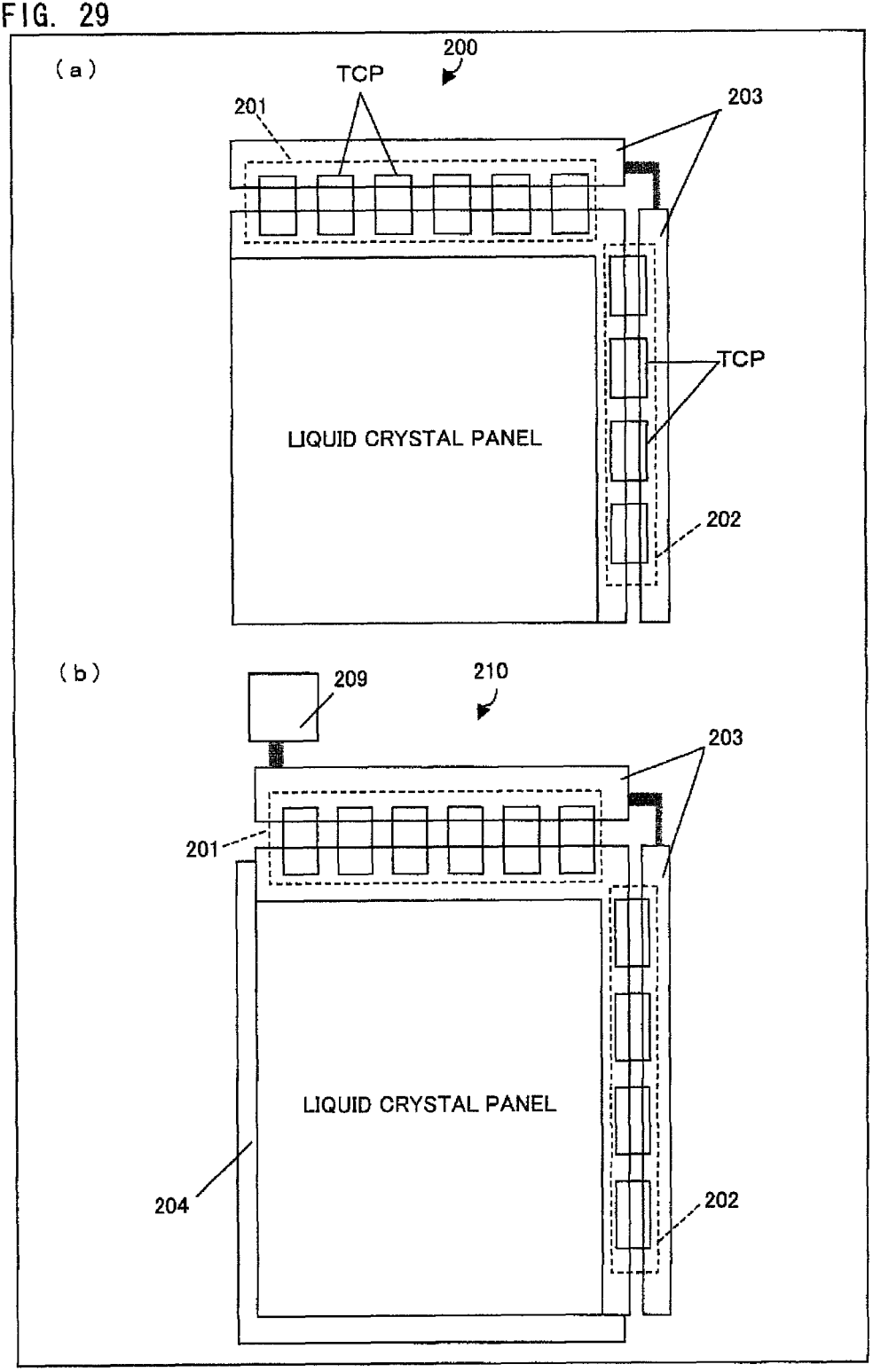
FIG. 29

In the present embodiment, the present liquid crystal display unit and liquid crystal display device are configured as described below. Namely, two polarizing plates A and B are adhered on surfaces of the liquid crystal panel on either side of the liquid crystal panel so that a polarization axis of the polarizing plate A and a polarization axis of the polarizing plate B intersect at right angles to each other. The polarizing plate may be laminated with an optical compensation sheet or the like if necessary. Next, as illustrated in FIG. 29($a$), the liquid crystal panel is connected to drivers (gate driver 202, source driver 201). In the embodiment, a connection of the driver by a TCP method is described as one example. First, an ACF is provisionally compressed to a terminal section of the liquid crystal panel. Next, a TCP on which the driver is disposed is punched out from a carrier tape; the TCP is aligned with a panel terminal electrode, and thereafter the TCP is heated and firmly compressed. Thereafter, a circuit substrate 209 (PWB) for linking the driver TCP together and an input terminal of the TCP is connected by the ACF. This obtains the liquid crystal display unit 200. Thereafter, as illustrated in FIG. 29($b$), the drivers (201 and 202) of the liquid crystal display unit are connected to a display control circuit 209 via the circuit substrate 201, to integrate the drivers with the lighting device (backlight unit) 204. This obtains the liquid crystal display device 210.

Figure 30:
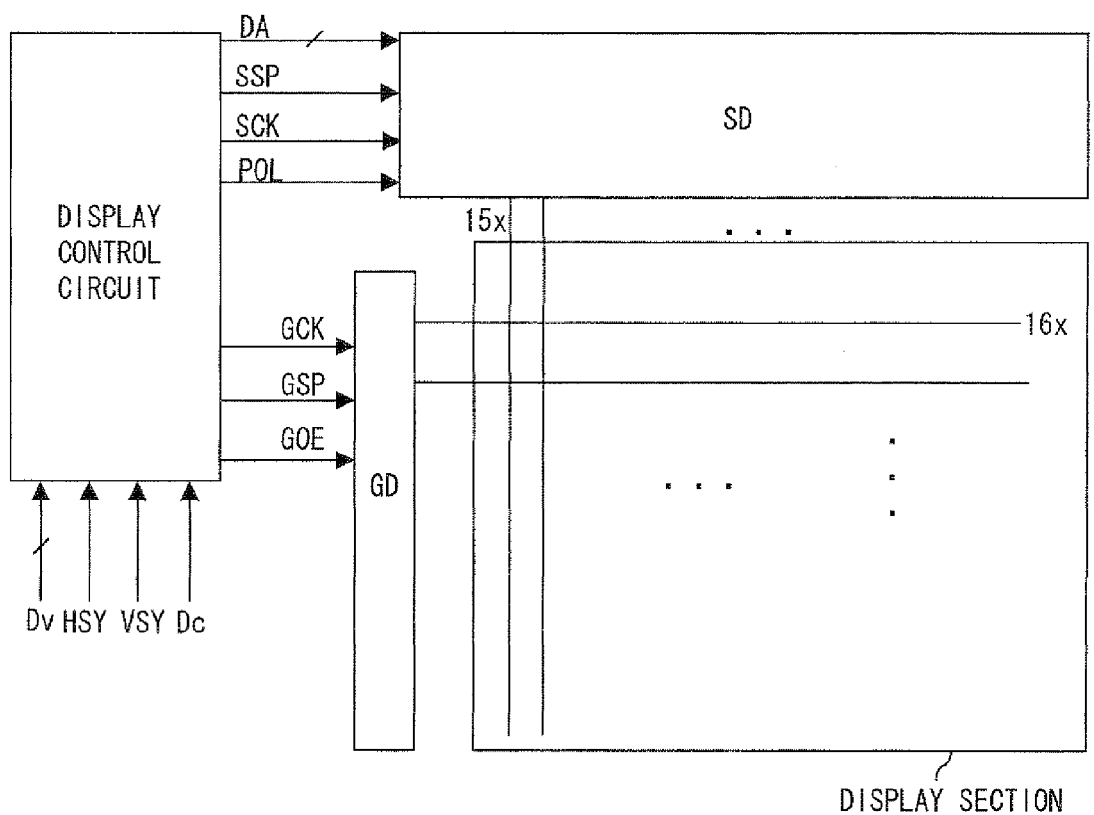
FIG. 30

FIG. 30 is a block diagram illustrating a configuration of the present liquid crystal display device. As illustrated in FIG. 30, the present liquid crystal display device includes a display section (liquid crystal panel), a source driver (SD), a gate driver (GD), and a display control circuit. The source driver drives data signal lines, the gate driver drives scanning signal lines, and the display control circuit controls the source driver and the gate driver.

The display control circuit receives, from an external signal source (e.g., a tuner), a digital video signal Dv representing an image to be displayed, a horizontal sync signal HSY and vertical sync signal VSY corresponding to the digital video signal Dv, and a control signal Dc for controlling a display operation. Moreover, based on these received signals Dv, HSY, VSY, and Dc, the display control circuit generates, as signals for displaying on the display section the image represented by the digital video signal Dv: a data start pulse signal SSP, a data clock signal SCK, a digital image signal DA (signal corresponding to the video signal Dv) representing the image to be displayed, a gate start pulse signal GSP, a gate clock signal GCK, and a gate driver output control signal (scanning signal output control signal) GOE. The display control circuit then outputs these signals.

More specifically, the display control circuit (i) outputs the video signal Dv as the digital image signal DA, after carrying out timing adjustment and the like of the video signal Dv by use of an inner memory as necessary, (ii) generates the data clock signal SCK as a signal made up of a pulse corresponding to pixels in the image that the digital image signal DA represents, (iii) generates the data start pulse signal SSP as a signal that, based on the horizontal sync signal HSY, becomes a high-level (H level) for just a predetermined time per horizontal scanning period, (iv) generates a gate start pulse signal GSP as a signal that, based on the vertical sync signal VSY, becomes a H level for just a predetermined time per frame period (one vertical scanning period), (v) generates a gate clock signal GCK based on the horizontal sync signal HSY, and (vi) generates a gate driver output control signal GOE based on the horizontal sync signal HSY and control signal Dc.

Among the signals that are generated in the display control circuit as aforementioned, the digital image signal DA, a polarity inversion signal POL that controls a polarity of the signal electric potential (data signal electric potential), the data start pulse signal SSP, and the data clock signal SCK are inputted into the source driver; whereas the gate start pulse signal GSP, gate clock signal GCK, and gate driver output control signal GOE are inputted into the gate driver.

The source driver successively generates, per one horizontal scanning period, an analog electric potential (signal electric potential) that is equivalent to a pixel value in the scanning signal lines of the image represented by the digital image signal DA, based on the digital image signal DA, the data clock signal SCK, the data start pulse signal SSP, and the polarity inversion signal POL. The source driver then outputs these data signals to the data signal lines.

The gate driver generates a gate on-pulse signal based on the gate start pulse signal GSP, the gate clock signal GCK, and the gate driver output control signal GOE, and outputs this generated signal to the scanning signal line. This causes the scanning signal lines to be selectively driven.

By driving the data signal lines and scanning signal lines of the display section (liquid crystal panel) by the source driver and gate driver as described above, a signal electric potential is written into a pixel electrode from the data signal lines via a transistor (TFT) connected to the selected scanning signal line. As a result, a voltage is applied to a liquid crystal layer of the sub-pixels, which controls the amount of light transmitted from the backlight. This causes display of the image represented by the digital video signal Dv on the sub-pixels.

Figure 31:
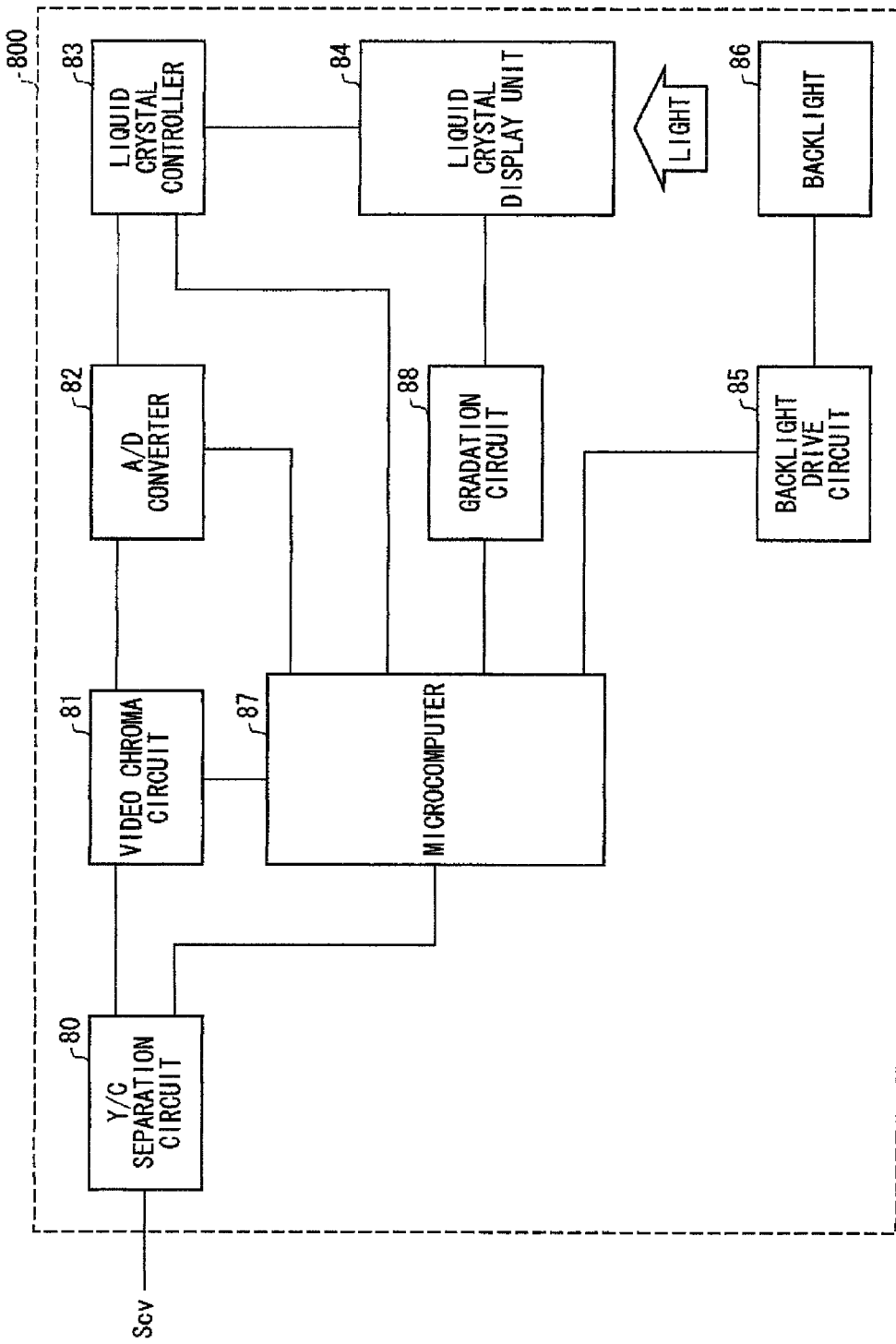
FIG. 31

The following description explains one configuration example of the present liquid crystal display device in a case where the liquid crystal display device is applied to a television receiver. FIG. 31 is a block diagram illustrating a configuration of a liquid crystal display device 800 for use in a television receiver. The liquid crystal display device 800 includes: a liquid crystal display unit 84; a Y/C separation circuit 80, a video chroma circuit 81; an A/D converter 82; a liquid crystal controller 83; a backlight driving circuit 85; a backlight 86; a microcomputer (microcomputer) 87; and a gradation circuit 88. The liquid crystal display unit 84 includes a liquid crystal panel, and a source driver and gate driver for driving the liquid crystal panel.

In the liquid crystal display device 800 of this configuration, first, a composite color video signal Scv as a television signal is inputted into the Y/C separation circuit 80 from outside, and the composite color video signal Scv is divided into a brightness signal and a color signal. The brightness signal and color signal are converted by the video chroma circuit 81 into analog RGB signals that correspond to the light's three principle colors, and further the analog RGB signals are converted by the A/D converter 82 into digital RGB signals. The digital RGB signals are inputted into the liquid crystal controller 83. Moreover, in the Y/C separation circuit 80, horizontal and vertical sync signals are also retrieved from the composite color video signal Scv inputted from the outside. These sync signals also are inputted into the liquid crystal controller 83 via the microcomputer 87.

In the liquid crystal display unit 84, the digital RGB signals are inputted from the liquid crystal controller 83 at a predetermined timing, together with a timing signal based on the sync signal. Moreover, in the gradation circuit 88, gradation electric potentials are generated for each of the three principle colors of color display R, G, B. These gradation electric potentials are also supplied to the liquid crystal display unit 84. In the liquid crystal display unit 84, a driving signal (data signal=signal electric potential, scanning signal etc.) is generated by the source driver, gate driver and the like provided inside, based on the RGB signals, the timing signal, and the gradation electric potentials, and a color image is displayed on the inner liquid crystal panel based on the driving signal. In order to display an image by the liquid crystal display unit 84, it is necessary to irradiate light from a rear side of liquid crystal panel inside of the liquid crystal display unit. With the liquid crystal display device 800, light is irradiated on a back side of the liquid crystal panel by having the backlight driving circuit 85 drive the backlight 86 under control of the microcomputer 87. Control of the entire system including the foregoing processes is carried out by the microcomputer 87. Video signals inputted from the outside (composite color video signal) may be not just video signals based on television broadcast, but may also be video signals captured by a camera and video signals supplied via Internet connection. With use of the liquid crystal display device 800, it is possible to perform image display based on various video signals.

Figure 32:
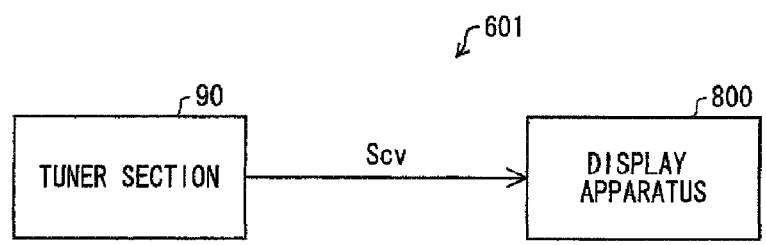
FIG. 32

In a case where an image based on television broadcast is displayed by the liquid crystal display device 800, a tuner section 90 is connected to the liquid crystal display device 800 as illustrated in FIG. 32, thus configuring the present television receiver 601. The tuner section 90 extracts signals of channels to be received among waves (high frequency signals) that are received by an antenna (not illustrated), and converts them to an intermediate frequency signal. By detecting this intermediate frequency signal, composite color video signals Scv as a television signal are taken out. The composite color video signal Scv is, as already described, inputted into the liquid crystal display device 800, and an image based on this composite color video signal Scv is displayed on the liquid crystal display device 800.

Figure 33:
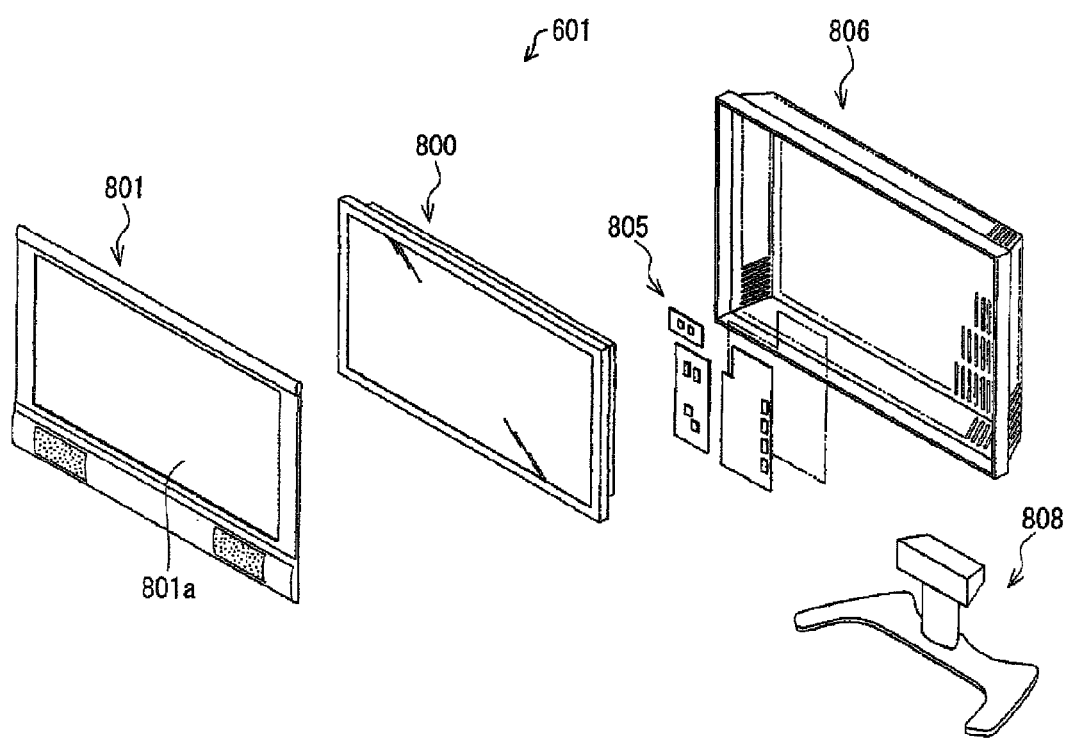
FIG. 33

FIG. 33 is an exploded perspective view of an example illustrating one configuration of the present television receiver. As illustrated in FIG. 33, the present television receiver 601 includes, as its constituents, the liquid crystal display device 800, a first housing 801 and a second housing 806. The first housing 801 and second housing 806 sandwiches the liquid crystal display device 800 so that the liquid crystal display device 800 is surrounded by the two housings. The first housing 801 has an opening 801a that transmits an image displayed on the liquid crystal display device 800. Moreover, the second housing 806 covers a rear side of the liquid crystal display device 800, and includes an operation circuit 805 for operating the display device 800. Further, the second housing 806 has a supporting member 808 disposed to its lower side.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

An active matrix substrate and a liquid crystal panel including the active matrix substrate, each of the present invention, are suitably used for a liquid crystal television, for example.

REFERENCE SIGNS LIST

101 to 104 pixel
12a transistor
15x data signal line
16x scanning signal line
17a pixel electrode (first pixel electrode)
17b pixel electrode (second pixel electrode)
18p storage capacitor wire
22 gate insulating film
25 interlayer insulating film
37,47 upper layer capacitor electrode (second capacitor electrode)
77 lower layer capacitor electrode (first capacitor electrode)
84 liquid crystal display unit
601 television receiver
800 liquid crystal display device

The invention claimed is:
1. An active matrix substrate comprising:
a data signal line;
a first insulating film;
a second insulating film;
a transistor;
a first pixel electrode connected to the data signal line via the transistor;
a second pixel electrode;
a first capacitor electrode electrically connected to the second pixel electrode; and
a second capacitor electrode electrically connected to the first pixel electrode,
wherein:
the second capacitor electrode is provided in a layer sandwiched between the first capacitor electrode and the second pixel electrode,
the second capacitor electrode overlaps the first capacitor electrode via the first insulating film to form a capacitor between the first capacitor electrode and the second capacitor electrode, and
the second pixel electrode overlaps the second capacitor electrode via the second insulating film to form another capacitor between the second capacitor electrode and the second pixel electrode.

2. An active matrix substrate comprising:
a data signal line;
a first insulating film;
a second insulating film;
a transistor;
a first pixel electrode connected to the data signal line via the transistor;
a second pixel electrode;
a first capacitor electrode electrically connected to the first pixel electrode; and
a second capacitor electrode electrically connected to the second pixel electrode,
wherein:
the second capacitor electrode is provided in a layer sandwiched between the first capacitor electrode and the first pixel electrode,
the second capacitor electrode overlaps the first capacitor electrode via the first insulating film to form a capacitor between the first capacitor electrode and the second capacitor electrode, and
the first pixel electrode overlaps the second capacitor electrode via the second insulating film to form another capacitor between the second capacitor electrode and the first pixel electrode.

3. The active matrix substrate according to claim 1, further comprising:
a scanning signal line, being provided in a same layer as the first capacitor electrode.

4. The active matrix substrate according to claim 1, wherein the second capacitor electrode is provided in a same layer as the data signal line.

5. The active matrix substrate according to claim 1, wherein the second insulating film has a thickness not thicker than that of the first insulating film.

6. The active matrix substrate according to claim 1, wherein the first insulating film is a gate insulating film.

7. The active matrix substrate according to claim 1, wherein the second insulating film is an interlayer insulating film covering a channel of the transistor.

8. The active matrix substrate according to claim 1, wherein the first capacitor electrode has two edges running parallel to each other and the second capacitor electrode also has two edges running parallel to each other, and from a plan view perspective of the active matrix substrate, both the edges of the first capacitor electrode are disposed on inner sides of respective edges of the second capacitor electrode.

9. The active matrix substrate according to claim 1, wherein the first capacitor electrode has two edges running parallel to each other and the second capacitor electrode also has two edges running parallel to each other, and from a plan view perspective of the active matrix substrate, both the edges of the second capacitor electrode are disposed on inner sides of respective edges of the first capacitor electrode.

10. The active matrix substrate according to claim 1, further comprising a storage capacitor wire being disposed so as to be overlapped by the first pixel electrode and the second pixel electrode.

11. The active matrix substrate according to claim 1, wherein the second pixel electrode and the first capacitor electrode are connected via a contact hole hollowed through the first insulating film and the second insulating film.

12. The active matrix substrate according to claim 1, wherein the transistor has a conductive electrode from which the transistor is connected to the first pixel electrode via a contact hole, and the first pixel electrode is connected to the second capacitor electrode via a contact hole different from the contact hole connecting the conductive electrode of the transistor and the first pixel electrode.

13. The active matrix substrate according to claim 2, wherein the first pixel electrode and the first capacitor electrode are connected via a contact hole hollowed through the first insulating film and the second insulating film.

14. The active matrix substrate according to claim 2, further comprising a drain draw-out electrode being drawn out from a conductive electrode of the transistor, and the drain draw-out electrode being connected to the first capacitor electrode and the first pixel electrode by a single contact hole hollowed through the first insulating film and the second insulating film.

15. The active matrix substrate according to claim 14, wherein the drain draw-out electrode has a hollowed section or a notch section which overlaps an opening of the contact hole and the first capacitor electrode.

16. An active matrix substrate comprising:
   a first insulating film;
   a second insulating film;
   a transistor;
   a first pixel electrode electrically connected to the transistor;
   a second pixel electrode;
   a first capacitor electrode electrically connected to the second pixel electrode; and
   a second capacitor electrode electrically connected to the transistor,
   wherein:
   the second capacitor electrode is provided in a layer sandwiched between the first capacitor electrode and the second pixel electrode;
   the second capacitor electrode overlaps the first capacitor electrode via the first insulating film to form a capacitor between the first capacitor electrode and the second capacitor electrode, and
   the second pixel electrode overlaps the second capacitor electrode via the second insulating film to form another capacitor between the second capacitor electrode and the second pixel electrode.

17. The active matrix substrate according to claim 16, further comprising:
   a third capacitor electrode connected to the second capacitor electrode in a same layer as the second capacitor electrode; and
   a storage capacitor wire forming a capacitor with the third capacitor electrode.

18. A liquid crystal panel comprising an active matrix substrate as set forth in claim 1.

19. A liquid crystal panel comprising:
   an active matrix substrate as set forth in claim 1; and
   a counter substrate having a linear projection for alignment controlling, being disposed in such a manner that at least a part of the first capacitor electrode is disposed below the linear projection.

20. A liquid crystal panel comprising:
   an active matrix substrate as set forth in claim 1; and
   a counter substrate including a common electrode that has a slit for alignment controlling, being disposed in such a manner that at least a part of the first capacitor electrode is disposed below the slit.

21. A liquid crystal display unit comprising:
   a liquid crystal panel as set forth in claim 18; and
   a driver.

22. A liquid crystal display device comprising:
   a liquid crystal display unit as set forth in claim 21; and
   a light source unit.

23. A television receiver comprising:
   a liquid crystal display device as set forth in claim 22; and
   a tuner section configured to receive television broadcast.

* * * * *